(12) United States Patent
DeFrank et al.

(10) Patent No.: US 11,791,907 B2
(45) Date of Patent: Oct. 17, 2023

(54) OPTICAL I/O TRANSMISSION

(71) Applicant: Lucinda Price, Penn Valley, CA (US)

(72) Inventors: Edmond DeFrank, Northridge, CA (US); Charles Price, Sweetwater, TN (US); Stanley Jacobson, Palm Desert, CA (US); Joseph Auciello, Penn Valley, CA (US); Lucinda Price, Penn Valley, CA (US)

(73) Assignee: CALSYS HOLDINGS, LLC, Las Vegas, NV (US)

( * ) Notice: Subject to any disclaimer, the term of this patent is extended or adjusted under 35 U.S.C. 154(b) by 0 days.

(21) Appl. No.: 15/269,985

(22) Filed: Sep. 20, 2016

(65) Prior Publication Data

US 2017/0272175 A1  Sep. 21, 2017
US 2023/0045773 A9  Feb. 9, 2023

Related U.S. Application Data

(63) Continuation of application No. 14/578,269, filed on Dec. 19, 2014, now Pat. No. 9,449,641, which is a
(Continued)

(51) Int. Cl.
*H04N 1/46* (2006.01)
*G11B 13/04* (2006.01)
(Continued)

(52) U.S. Cl.
CPC ........... *H04B 10/80* (2013.01); *G11B 13/045* (2013.01); *G11B 20/00007* (2013.01);
(Continued)

(58) Field of Classification Search
CPC .... H04B 10/40; H04B 10/502; H04B 10/503; H04B 10/80; G11B 13/045; G11B 20/00007; G11B 20/10009; H04N 1/46
(Continued)

(56) References Cited

U.S. PATENT DOCUMENTS 5,438,674 A * 8/1995 Keele ................... G11B 7/0037
703/23
5,784,377 A * 7/1998 Baydar ............... H04L 41/0213
370/386
(Continued)

OTHER PUBLICATIONS

Waqas et al; Software Defined VLC System: Implementation and Performance Evaluation; 2015; 4th International workshop on Optical Wireless Communications; pp. 1-5. (Year: 2015).*
(Continued)

*Primary Examiner* — Amritbir K Sandhu
(74) *Attorney, Agent, or Firm* — Lucinda Grace Price

(57) ABSTRACT

A system comprises a writer to form a plurality of color mits on a base material, wherein at least one of the color mits may represent computer-readable instructions comprising data other than pixel-image data. The plurality of color mits may include a first color mit and a second color mit, wherein the first color mit represents information data, and the second color mit represents that the first color mit contains a particular type of information data. The system also may include a reader to read colors of the plurality of color mits on the base material. The system may comprise a device to map at least one of the color mits to computer-readable instructions. The system may further comprise a processor configured to transmit signals using a colored light.

20 Claims, 17 Drawing Sheets

Related U.S. Application Data continuation of application No. 13/983,557, filed as application No. PCT/US2012/023889 on Feb. 3, 2012, now Pat. No. 8,942,071.

(60) Provisional application No. 61/462,582, filed on Feb. 4, 2011.

(51) Int. Cl.
  *G11B 20/00* (2006.01)
  *G11B 20/10* (2006.01)
  *H04B 10/40* (2013.01)
  *H04B 10/50* (2013.01)
  *H04B 10/80* (2013.01)

(52) U.S. Cl.
  CPC ....... *G11B 20/10009* (2013.01); *H04B 10/40* (2013.01); *H04B 10/502* (2013.01); *H04B 10/503* (2013.01); *H04N 1/46* (2013.01)

(58) Field of Classification Search
  USPC .................................. 398/115, 116, 117, 135
  See application file for complete search history.

(56) References Cited

U.S. PATENT DOCUMENTS

| | | | | |
|---|---|---|---|---|
| 5,877,882 A * | 3/1999 | Green | H04B 10/40 | 398/115 |
| 6,012,100 A * | 1/2000 | Frailong | H04L 43/065 | 709/250 |
| 6,850,707 B1 | 2/2005 | Chang et al. | | |
| 7,809,266 B2 | 10/2010 | Lee | | |
| 8,139,504 B2 * | 3/2012 | Mankins | H04W 40/26 | 370/254 |
| 8,254,790 B2 | 8/2012 | Okano et al. | | |
| 8,879,926 B2 * | 11/2014 | Susanto | G02B 6/423 | 398/135 |
| 8,942,071 B2 * | 1/2015 | Price | H04B 10/40 | 369/13.02 |
| 2004/0126065 A1 * | 7/2004 | Levy | G02B 6/43 | 385/88 |
| 2004/0126115 A1 * | 7/2004 | Levy | G02B 6/4201 | 398/116 |
| 2005/0135449 A1 * | 6/2005 | Sorin | H04B 10/506 | 398/43 |
| 2005/0204056 A1 * | 9/2005 | Choi | G11B 20/10 | 709/236 |
| 2008/0285979 A1 * | 11/2008 | Suzuki | H04B 10/25751 | 398/140 |
| 2010/0059822 A1 * | 3/2010 | Pinguet | H01L 27/1203 | 257/351 |
| 2010/0067916 A1 * | 3/2010 | Suzuki | H04B 10/116 | 398/130 |
| 2010/0111473 A1 * | 5/2010 | Pinguet | G02B 6/34 | 385/37 |
| 2010/0135673 A1 * | 6/2010 | Son | H04B 10/1149 | 398/183 |
| 2011/0033188 A1 * | 2/2011 | Elbers | H04J 14/02 | 398/79 |
| 2011/0200338 A1 * | 8/2011 | Yokoi | H04B 10/116 | 398/158 |
| 2011/0229147 A1 * | 9/2011 | Yokoi | H04B 10/116 | 398/172 |
| 2011/0317996 A1 * | 12/2011 | Gee | H04B 10/0779 | 398/20 |
| 2012/0087677 A1 * | 4/2012 | Jang | H04B 10/116 | 398/183 |
| 2012/0290611 A1 * | 11/2012 | Petrov | G06Q 30/0241 | 707/E17.014 |
| 2013/0177309 A1 * | 7/2013 | El-Ahmadi | H04L 1/0057 | 398/25 |
| 2013/0266309 A1 * | 10/2013 | Binkert | H04L 49/30 | 398/19 |
| 2013/0315045 A1 * | 11/2013 | Price | H04N 1/46 | 369/13.02 |
| 2014/0010498 A1 * | 1/2014 | Verslegers | G02B 5/1861 | 385/37 |
| 2015/0109140 A1 * | 4/2015 | Probel | H03M 7/30 | 340/855.4 |
| 2015/0125158 A1 * | 5/2015 | El-Ahmadi | H04L 1/0057 | 398/135 |
| 2017/0272175 A1 * | 9/2017 | DeFrank | G11B 20/00007 | |
| 2017/0315887 A1 * | 11/2017 | Olson | G06F 11/2033 | |
| 2018/0083715 A1 * | 3/2018 | Greene | H04L 12/40 | |

OTHER PUBLICATIONS

Waqas et al; Software Defined VLC System: Implementation and Performance Evaluation; 2015; International Workshop on Optical Wireless Implementation and performance; pp. 1-5. (Year: 2015).*
http://www.tomshardware.com/forum/247215-29-optical-motherboards, May 16, 2008, "Optical Motherboards".
David A. B. Miller, Are optical transistors the logical next step?, Nature Photonics, Jan. 2010, pp. 3-5, vol. 4, Macmillian Publishers, www.nature.com/naturephotonics.
IBM, Optical waveguides and silicon nanophotonics pave the way to energy efficient supercomputers, IBM Research—Zurich integrates optical data transmission in computers and processors, May 17, 2011, pp. 1-3, Swiss Institute of Technology Zurich, www.zurich.ibm.com/nanocenter.
https://www.rp-photnics.com/spotlight_2009_08_12.html.
Chris Kraeuter, Intel boasts a fiber-optic breakthrough, CBS Marketwatch.com, Feb. 12, 2004, 3 pages https://www.marketwatch.com/story/intel-claims-research-breakthrough-in-fiber-optics.
"Optical Switching" By Georgios I. Papadimitriou, et al. IEEE Optical Components and Optics, Chapter 3.2.2.—Header Format, Transmission, and Processing, 2007 https://www.globalspec.com/reference/14901/16021 Of chapter-3-2-2-header-format-transmission-and-processing.
MIT Technology Review Editors, Shrinks Optical Circuitry to Speed Transmissions on Phone and Internet Networks, MIT Technology Review, https://www.technologyreview.com/innovators-under-35/materials-2003/, Oct. 1, 2003, p. 10.

* cited by examiner

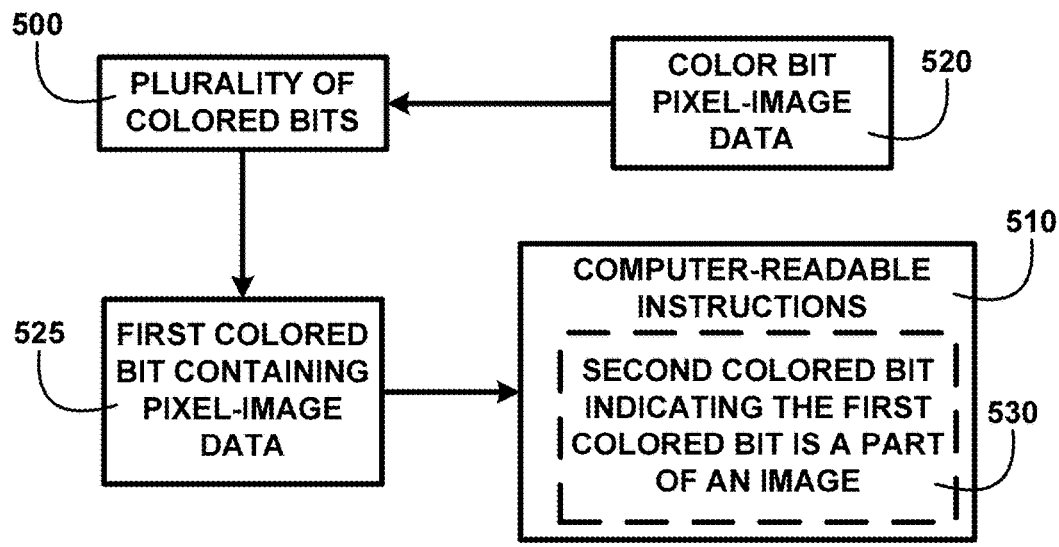
FIG. 5A
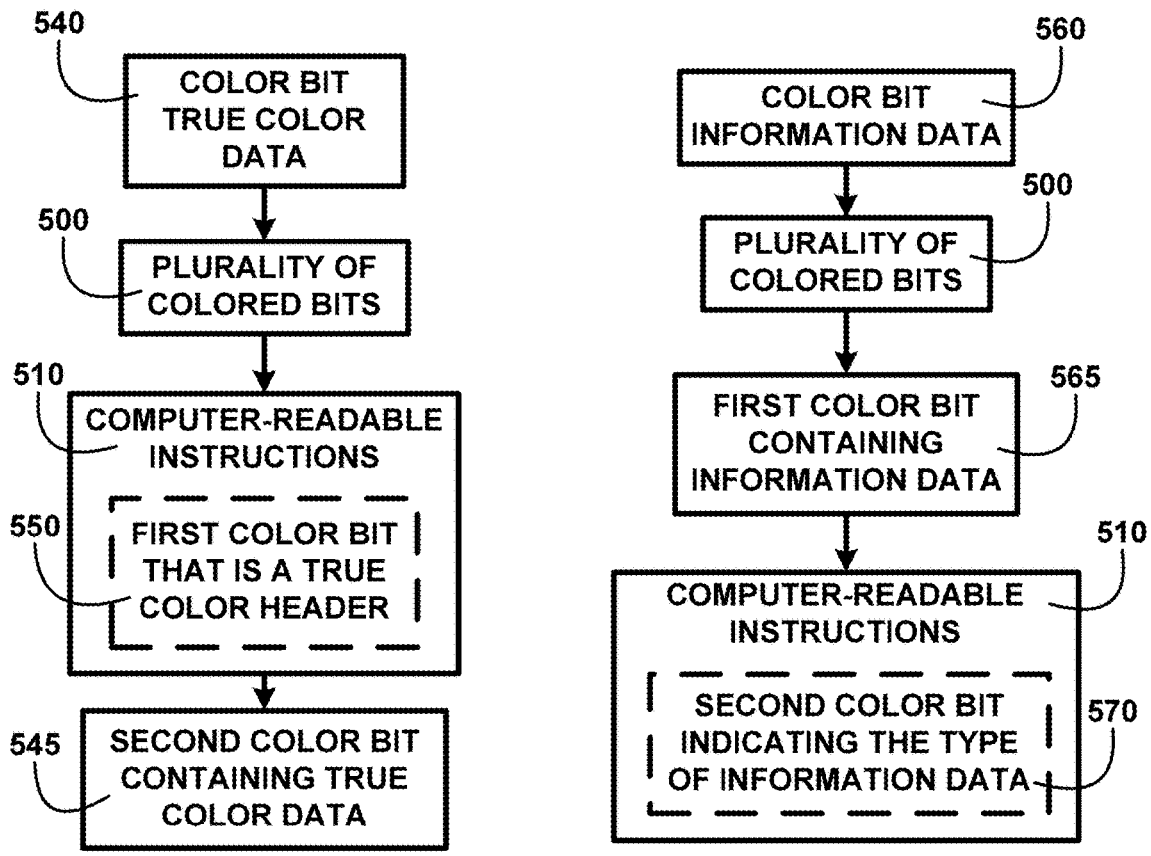
FIG. 5B     FIG. 5C

OPTICAL I/O TRANSMISSION

CROSS-REFERENCE TO RELATED APPLICATIONS

This application is a continuation of U.S. application Ser. No. 14/578,269, now U.S. Pat. No. 9,449,641, which is a continuation of U.S. application Ser. No. 13/983,557, now expired U.S. Pat. No. 8,942,071, which is a U.S. National Filing of Application PCT/US/2012/02388, which claims the benefit of U.S. Patent Provisional application entitled "Color Storage System and Method" having Ser. No. 61/462,582 and filing date: Feb. 4, 2011, by Inventors: Lucinda Grace Price, Joseph Auciello, Charles Price, and Stanley Jacobson.

BACKGROUND

Areal density represents the amount of information bits on a surface. In Hard Disk Drives (HDDs), areal density is limited by the superparamagnetic limit (the number of information bits that may fit on a given surface, wherein the bits are separated from each other enough not to affect or be effected by the neighboring magnetic bits). High temperatures may adversely affect the superparamagnetic limit and the HDD thus may fail. HDDs may also fail if subjected to physical impact, radiation, electromagnetic fields, abrasive surfaces, or external magnetic forces. Solid State Devices (SSD) may also fail for many reasons, such as being subjected to radiation.

Most central processing units are labeled in terms of their clock rate (the rate at which the processor executes instructions). The current highest rate is about 6 or 7 GHz or 6-7 gigacycles per second. The clock cycle toggles between a logical 0 state and a logical 1 state.

BRIEF DESCRIPTION OF THE DRAWINGS

FIG. 5A shows a block diagram of an overview flow chart of a pixel-image data bit assignment of an embodiment of the present invention.

FIG. 5B shows a block diagram of an overview flow chart of a true color data bit assignment of an embodiment of the present invention.

FIG. 5C shows a block diagram of an overview flow chart of an information data bit assignment of an embodiment of the present invention.

DETAILED DESCRIPTION

General Overview

Color Mits, an Alternative to Bits

Figure 1:
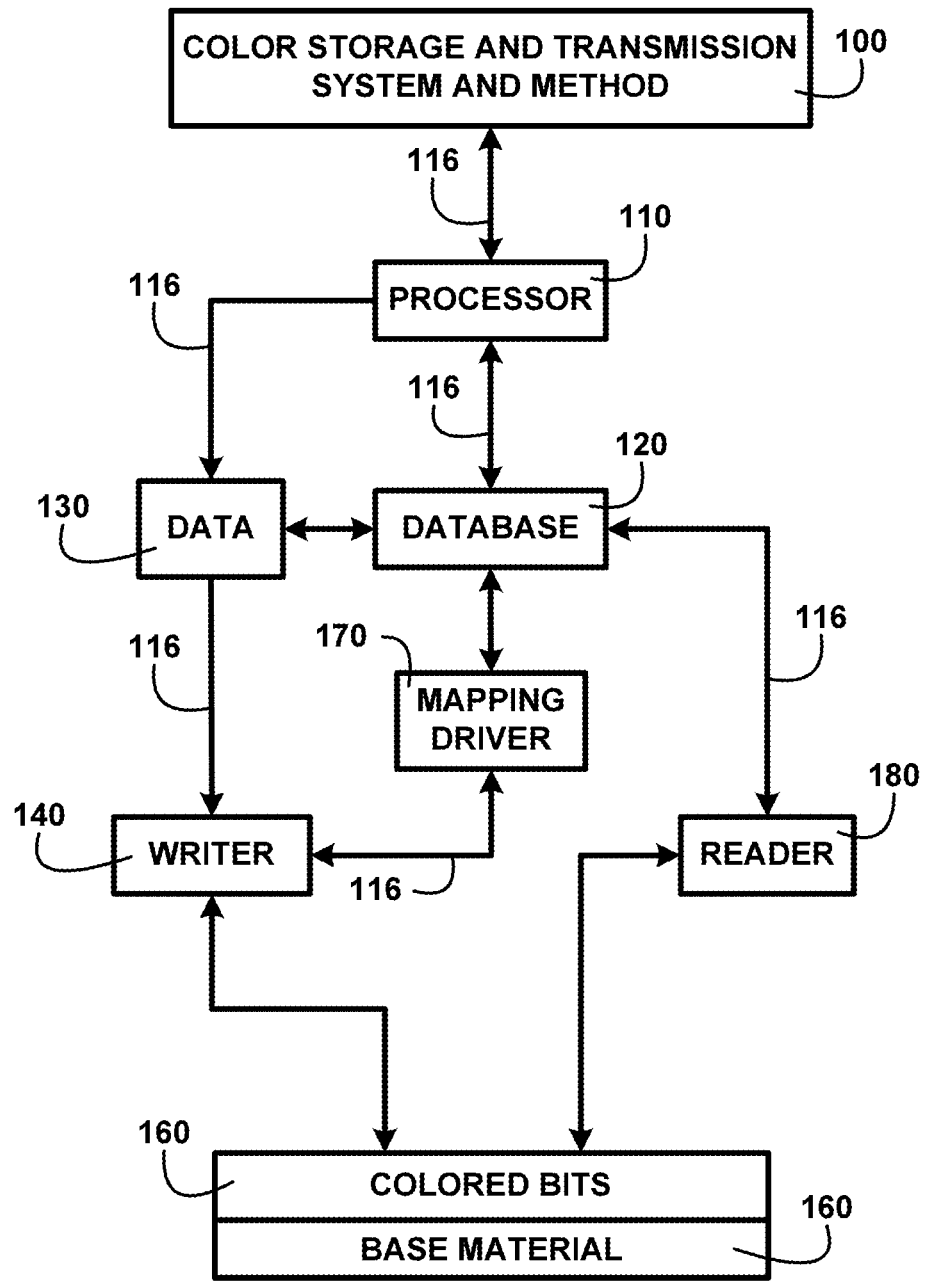
FIG. 1 shows a block diagram of an overview of a color storage and transmission system and method of an embodiment of the present invention.

Current computer architecture is based on single bit (i.e., contraction of 'binary digit'), on/off technology having 2 states for a single bit. The 2-state bits create computer code by grouping these single bits together into bytes. A byte is usually 8 bits. In an 8 bit byte there are $2^8$ or 256 possible combinations of bits in the 8 bit line.

A colored pixel is created from a 24-bit RGB number, thus a pixel can represent 24 bits of data. However, in a 24 bit byte there are $2^{24}$ or 16.78 million possible combinations in the 24 bits.

In an embodiment, there is a plurality of color mits on a substrate. The color-based system includes color mits. Each mit (or multi-state digit) has over 16 million state possibilities.

What Color Mits Represent

In an embodiment, colors and colored patterns are used as computer code to symbolize letters, numbers and/or complete words, sentences, phrases, works of art, a DNA string (of a particular species), a computer program/routine (of a particular computer language), the Periodic Table (or other scientific formulas/tables), the Bible (of a particular language), or true color.

Color mits may also symbolize an encryption method, a decryption method, an algorithm, a bytecode, a java applet, HTML code, or graphics code, for example. At least one of the color mits 150 may represent computer-readable instructions using data other than pixel-image data.

In an embodiment, the color mit may be an indexed color mit. A first and second color mit may be read by a reader or scanner. The second color mit represents index data, indicating what type of information the first color mit is. The first color mit represents information data (e.g., an English word) and the second color mit represents that the first color mit contains a particular type of information data, for example, the second color mit may be a key, formula, indicator, pointer, or index (e.g., English Language).

Writing the Color Mits

In an embodiment, a color mit writer or color transfer device may include a light source (laser) to record a color wave length frequency on the surface of or in the base material. The writer may erase a color mit and rewrite a different color mit in the same space on the base material. The writer or printer may be a color ink jet printer, a laser color jet printer, a laser engraver, or a color laser etcher.

In an embodiment, the color laser etcher, as described on www.thermark.com, may form each color mit, which may be chemically resistant to solvents, acids and bases, may withstand prolonged UV, radiation, and moisture exposure, abrasion resistant, and may withstand temperatures above 1800° F. or 980° C. To put this in perspective, temperatures above about 50° C. may cause an HDD failure.

In an embodiment, the color mits may be re-writable. The writer may write over the color mit to change the color of the color mit to a predetermined color. The color change uses a difference in the color information between the predetermined color and the color mit including changes in hue, saturation and intensity according to the predetermined color.

Reading the Color Mits

The reader may include a light source to illuminate the surface of the base material to read the color mit. The reader may use a color sensor/detector to receive or read the plurality of color mits reflected or refracted. The reader determines color information including hue, saturation, and intensity of the color mit. The reader detects visible or invisible colors.

Calibration

The color mit values of the test sections are checked against the color mit values in the color calibration table to determine accuracy. If the test color mit values are determined to vary from the calibrated values, the drivers for the writer and reader are adjusted to correct the variance.

Color Light Transmission

In an embodiment, color is referred to herein as different wavelengths of light and/or reflective properties of materials that may or may not be visible to the human eye.

A light bus may be used as a centralized bus for transmitting light and color based signals to and from components, such as a CPU and I/O units. The light bus allows transmission of color symbolized data in the form of light frequencies between components to occur at or near the speed of light without electrical limitations, thereby increasing processing speed. The color or color light wavesource including a laser and/or a LED can be capable of manipulating light, wherein manipulating the light includes bending light through a prism, halving a frequency of the light by passing through crystal, combining two or more colors to give a different color, or subtracting a color sensor from a light beam by passing it through a filter or multilayer coating. The manipulation of light includes processing functions as current processors, wherein functions include move, add, subtract, multiply, divide and basic logical, and input/output operations of a system.

Layered Color Storage

In an embodiment, there may be hybrid color mits, optical ridges, and/or magnetic bits in the same base material or substrate. In a hybrid system, a layer of color mits are used together with another layer of color mits, magnetic bits, or optical ridges. There are at least two layers of optical, magnetic, and/or color storage. One of the layers, for example, the index layer may be magnetic, optical or color. This index layer (or a mit on this layer) indicates information regarding another bit in the same layer or another layer. For example, the information may be a particular type of information, such as language, color, works of art, and even computer programs. So the same color mit might mean different things depending on what its corresponding index indicates.

Color Encryption

In an embodiment, there may be different laser colors for an optical layer encryption method. Just like the second color mit represents index data, indicating what type of information the first color mit is, in an example, the information associated with the color mit may indicate which laser color to use. In the instance of using optical layer(s), the laser beam uses wavelength hopping with an optical base material. The laser uses an index color, such as a red, blue, UV, or any other color laser, to read an index ridge, for instance, from the substrate. That index ridge indicates what the second laser color is to be, for instance, or some other data, such as a number or a letter. The second laser color, which may also be another index laser color, reads the substrate at the same or another indicated ridge or valley, which could indicate yet another color laser to use or yet some other data. Each color has a different wavelength and may then read each ridge and valley of optical storage differently.

In an embodiment, there may be different laser colors for a colored layers encryption method. In the instance where the information may indicate which laser color to use on the color layer(s), the laser beam uses color wavelength hopping with a color mit base material. The laser uses an index color, such as a red, blue, UV, or any other color laser, to read a color mit from the substrate. That indexed color mit indicates what the second laser color is to be, for instance, or some other data, such as a number or a letter. The second laser color, which may also be another index laser color, reads the substrate at the same or another indicated color mit, which could indicate yet another color laser to use or yet some other data. There is at least one layer of color storage (i.e., color mits), each of the color mits being read by a colored laser having a color selected as indicated by an indexed color mit.

An example of color laser on color mits encryption method is described as follows. In an example, if the indexed color mit indicates to use a red color laser on the next color mit in the process, and the next color mit is yellow, the red color laser beam strikes the yellow and returns orange to the scanner, the orange meaning a certain applet, for instance. If the red color laser beam strikes white, and returns pink to the scanner, the pink indicates a different routine, for instance. However, if the previously read indexed color mit indicates to use a blue color laser on the next color mit in the process, and the next color mit is yellow, the blue color laser beam strikes the yellow and returns green to the scanner, the green indicating yet a different computer program.

Each user may use the same color mit substrate and interpret it 16 million different ways for each color mit on the substrate. The same substrate may be given to different users, each user has their own program and database tables that writes to and/or interprets the color mits on the substrate, based on the different possible laser colors. In this embodiment, each user may create its own codebook, personal and customized, a unique key to understanding the storage data.

The encryption method may include one or more color mits positioned within a color mit sequence. The time it takes for a brute-force attack of the encryption depends on the number of permutations. For standard 8-bit encryption, there are $2^8$ permutations and for a device checking $2^{56}$ permutations per second, the time it takes to decrypt is less than a second. For a standard 128 bit key, there are $2^{128}$ permutations which takes about 149 trillion years to decrypt. In color storage, for 8-bit color encryption, there are 16.8 million$^8$ permutations, ($6.3 \times 10^{57}$ permutations) which would take 2.79 Decillion years ($2.79 \times 10^{33}$ years) to decrypt using brute force permutations.

It should be noted that for the descriptions that follow, for example, in terms of color storage and transmission systems and methods, they are described for illustrative purposes and the underlying system may apply to all types of systems and devices used for data storage, retrieval and processing. Computers, a web appliance, a network router, switch or bridge, or any machine capable of executing a set of instructions (sequential or otherwise) that specify actions to be taken by that system or component, cell phones, smart phones, tablet personal computers, set-top boxes (STB), a Personal Digital Assistant (PDA), and other portable devices with touch screens are within the scope of the descriptions. The system may operate in a synchronized series in a system, such as a network system. In this description, the terms computer, communication device, storage medium, hard drive or computer disk shall mean any system, component or I/O device whether it could be classified as an electronic device, digital device or other form of integrated circuit based system or device.

Detailed Operation

FIG. 1 shows a block diagram of an overview of the color storage and transmission system and method in an embodiment of the present invention. In FIG. 1, colors and colored patterns are used as computer code to symbolize letters, numbers and/or complete words, sentences, phrases, works of art, and even complete computer programs. The individual colors may also uniquely symbolize an encryption method, a decryption method, an algorithm, a bytecode, a program, java applet, HTML code, graphics code, or a routine, for example. Color is referred to herein as different wavelengths of light and/or reflective properties of materials that may or may not be visible to the human eye.

The color-based system 100 includes color mits 150 formed on a base material 160. Each mit (or multi-state digit) has over 16 million state possibilities. In a standard color mit model, three primary colors (such as, RGB or cyan, magenta, and yellow) and black and white may be mixed to make the 16.78 million possible combinations. The term "color mit" may include a colored pixel or dot, as described in more detail herein. In an embodiment, the color combinations create 16.78 million states for each single color mit.

In an embodiment, the color storage and transmission system and method 100 may include a processor 110 to process data, computer instructions and a database 120 to store and retrieve color mits 150, and associated data records, computer programs and computer instructions read from and written upon a base material 160. The processor 110 may include pre-written programs and functions. Increase in data storage capacity on a substrate may increase processing speed as more data can be read in the same processing cycle in an embodiment of the present invention.

A light bus 116 may be used as a centralized bus for transmitting light and color based signals to and from components, such as a CPU and I/O units, as described in more detail herein. The processor 110 may include color-based I/O units to input data into a color-based computer system and color-based devices to display or print data into a color-based computer system.

The color storage and transmission system and method 100 configured with the light bus 116 allows transmission of color symbolized data in the form of light frequencies between components to occur at or near the speed of light without electrical limitations, thereby increasing processing speed.

A database 120 is included which has an indexed table of color mits available and assigns symbols, functions or complete programs to a single color mit, as described in more detail herein. The database 120 uses the assigned data written and read in a read-write storage and retrieval process in an embodiment of the present invention. The indexed assigned data in the database is further processed in the CPU and I/O units in an embodiment of the present invention. The database 120 uses the base material 160 upon which to write data using writer 140.

The system 100 may include a mapping driver 170. The mapping driver 170 can control and log the mapping of the color mit based data. The mapping driver 170 may be used to determine the mapped location of the requested data on the base material 160 and direct a reader 180 to that location.

The writer 140 may include a color transfer device to record a plurality of color mits on the base material 160. The color transfer device may include a printing device to deposit a color on the surface of the base material 160. The color transfer device may include a light source to record a color wave length frequency on the surface of or in the base material 160. The writer 140 may erase a color mit and rewrite a different color mit in the same space on the base material 160 in one embodiment of the present invention.

At least one of the color mits 150 represents computer-readable instructions using data other than pixel-image data, as described in more detail herein.

The color storage and transmission system and method 100 can be a combination of 16.78 million mit color-based components and 2 bit on/off technology components to form a hybrid color-based computer system, as described in more detail herein.

In an embodiment, the base material 160 includes a first color mit and a second color mit. The first color mit represents pixel-image data and the second color mit represents that the first color mit is a part of an image. The second color mit represents index data, indicating what type of information the first color mit is. The first color mit represents information data and the second color mit represents that the first color mit contains a particular type of information data, the second color mit being a key, formula, indicator, pointer, or index.

The plurality of color mits 150 on the base material 160 represents image-pixel data and characters, in an embodiment. At least one of the color mits 150 of FIG. 1 represents computer-readable instructions comprising data 130 other than pixel-image data. The data other than the image-pixel data may include computer-readable data.

The plurality of color mits 150 on the base material 160 may be at least 1200 dpi, for instance. The writer 140 may write a plurality of colors to the base material 160 using, for example, laser color etching with a density of at least 1200 dpi, for instance. The reader 180 may read the color mits at at least 1200 dpi, for instance. A density of 1200 dpi produces approximately 1.44 Megamits per square inch, each of those mits having at least 16.78 million possible instructions or data in an embodiment of the present invention. Although this embodiment discusses 1200 dpi, any density, higher or lower is within the scope of the embodiments.

The reader 180 may include a light source to illuminate the surface of the base material 160 to read the color mit. The reader 180 may use a color sensor/detector to receive or read the plurality of color mits 150 reflected or refracted. The reader 180 may use the bus 116 to connect to the database 120.

The system and method 100 may also include image data, which optimizes the amount of data that may be stored on the base material, thereby increasing the amount of data that can be stored in the same physical area. The reduced number of bits also reduces the number of processing cycles to transmit the same amount of data which can now occur at or near the speed of light thereby increasing the computer processing speed in an embodiment of the present invention. In particular, the computer processes 1 color mit, instead of processing a million bits, for example.

Figure 2:
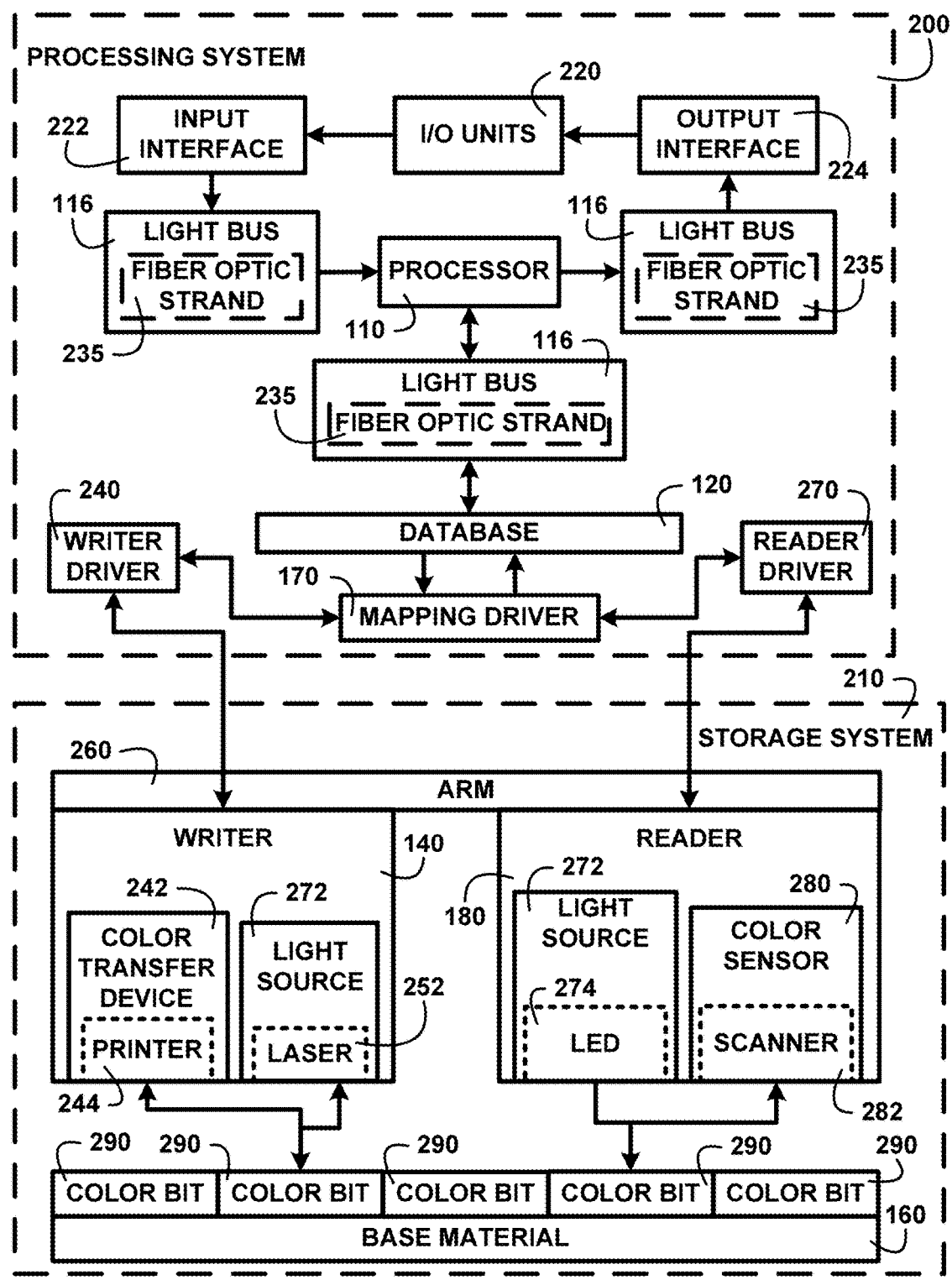
FIG. 2 shows a block diagram of an overview flow chart of a color storage and transmission system and method of an embodiment of the present invention.

FIG. 2 shows a block diagram of an overview flow chart of color storage and transmission system and method of an embodiment of the present invention. FIG. 2 shows the color storage and transmission system 210 and method 100 of FIG. 1 and the processing system 200 receiving information from I/O units 220. The system 200 includes I/O units 220 coupled with an input interface 222 that may allow input from I/O unit(s) 220, a user or an automated data source device, such as an automated weather station or manufacturing processor.

The input interface 222 processes through the database 120 to initially convert data being inputted into a color mit format. The inputted data is transmitted through the light bus 116 which includes one or more fiber optic strands 235 or other optical transmitting material. The light bus 116 connects to the processor 110 for processing and routing. The color storage and transmission system and method 100 of FIG. 1 may be used with the processor 110 to perform processing of data, calculations and other processing functions to form a color mit computer system.

The processor 110 passes computer readable instructions from the database 120 through the bus 116 to a writer driver 240 to record the inputted data in a color mit format. The processor 110 can be structured to use light transmission circuits within the processor architecture to increase processing speeds. The transmission of signals in the processor 110 may use a colored light such as that produced by a LED 274.

The processor 110 passes computer readable instructions from the database 120 through the light bus 116 to the writer driver 240 to record the inputted data in a color mit format. The writer driver 240 and writer 140 can be attached to an arm 260 positioned above the base material 160. The writer 140 uses the color transfer device 242 which may be a printer 244. The printer 244 may be a color ink jet printer, a laser color jet printer, a laser engraver, or a color laser etcher, for example. The printer 244 may imprint, for example, the base material 160 with one or more colors of ink or other imprinting medium. The system may use electron beam lithography or sputtering to deposit material on the substrate or any known method of depositing color on a substrate.

The processor 110 may embed the database 120 into the processor chip wherein the processor 110 performs read and write functions using the database 120 to convert color mits into data, or vice versa. The database 120 incorporates tables of prewritten database tables and records new color mit data. The database 120 includes computer readable instructions referenced and indexed by color mits, as shown in an embodiment herein.

The location on the base material 160 where a color mit 290 is recorded is transmitted from the writer 140 to the writer driver 240. The writer driver 240 processes the location information and data identification information and records the information in the database 120.

The writer driver 240 may use the color information to communicate to the writer 140 to write over the color mit to change the color of the color mit to a predetermined color. The color change uses a difference in the color information between the predetermined color and the color mit including changes in hue, saturation and intensity according to the predetermined color, as described in more detail herein.

The writer 140 may erase a color mit and rewrite a different color mit in the same space on the base material 160. The writer 140 may use one or more light sources 272 (such as a laser 252) to erase (such as ablate) an existing color or overprint, using the color "white", previously an imprinted color mit 290 onto the location of the base material 160.

When the processor 110 instructs the writer 140 to rewrite over a particular location on the base material 160 the writer driver 240 may sequence the operation. The writer driver 240 may first initiate instructions to the laser 252 to erase any existing color and follow with an instruction for the printer 244 to imprint the new color mit 290 in an embodiment of the present invention.

The processor 110 may receive instructions from the input interface 222 to retrieve and display recorded particular data. The processor 110 transmits computer readable instructions from the database 120 through the light bus 116 to the reader driver 270. The reader driver 270 initiates operations of the reader 180, which may be located on the arm 260. The reader driver 270 directs the reader 180 to the mapped location of the particular data. The reader 180 may use the light source 272, such as a LED 274. The LED 274 projects light onto the base material 160. The projected light illuminates the color mit 290 for the reader to read the color of the color mit.

A color sensor 280 may include a color scanner 282 to analyze the reflected color to determine the hue, saturation, intensity and color light wave frequency of the color mit 290. The scanner may have the same size as the writing surface of the base material, in an embodiment, so that one scan of the entire surface is used to read each of the color mits. In other embodiments, the scanner may move to scan the plurality of color mits on the writing surface of the base material. The base material may spin, as in a HDD, or may be stationary, for instance.

The reader 180 may include instructions to transmit the hue, saturation, intensity and color light wave frequency of the color mit 290 to the writer driver 240 to allow determination of the amount of hue, saturation, intensity to be added to a color mit to adjust the existing color mit to a predetermined new color. The reader driver 270 converts the scanned information of the reflected color or color light wave frequency using a color mit model code to identify each color. The color or color light wavesource 272 including a laser 252 and a LED 274 can be capable of manipulating light, wherein manipulating the light includes bending light through a prism, halving a frequency of the light by passing through crystal, combining two or more colors to give a different color, or subtracting a color sensor 280 from a light beam by passing it through a filter or multilayer coating in an embodiment of the present invention.

The manipulation of light includes processing functions as current processors, wherein functions include move, add, subtract, multiply, divide and basic logical, and input/output operations of a system. The reader 180 transmits the retrieved color mit 290 code to the database 120. The database 120 may then be searched for the matching color, and the database information may then be transmitted through the bus 116 to the processor 110. The processor 110 then transmits computer readable instructions through the bus 116 to an output interface 224 to the I/O units 220. The retrieved information symbolized by the color mit 290 may then be printed, displayed or used to operate a piece of machinery such as a CNC lathe in an embodiment of the present invention.

The color storage and transmission system and method 100 of FIG. 1 may use the writer 140, reader 180, arm 260, base material 160 and database 120 combined to form a separate and distinct device. The combined color storage and transmission system and method 100 of FIG. 1 elements formed as a distinct device may perform operations configured as a memory device, a data storage device and a processing component within I/O devices, external memory devices and other devices using memory, data storage and retrieval such as a CPU or control system device.

The computer system configured completely with color-based components or a mix of color-based and magnetic bit based components can perform as a standalone personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that system or component. The computer system configured completely with color-based components or a mix of color-based and magnetic bit based components can operate in a synchronized series of system such as a network system in an embodiment of the present invention.

Color Mit Model Systems

Figure 3:
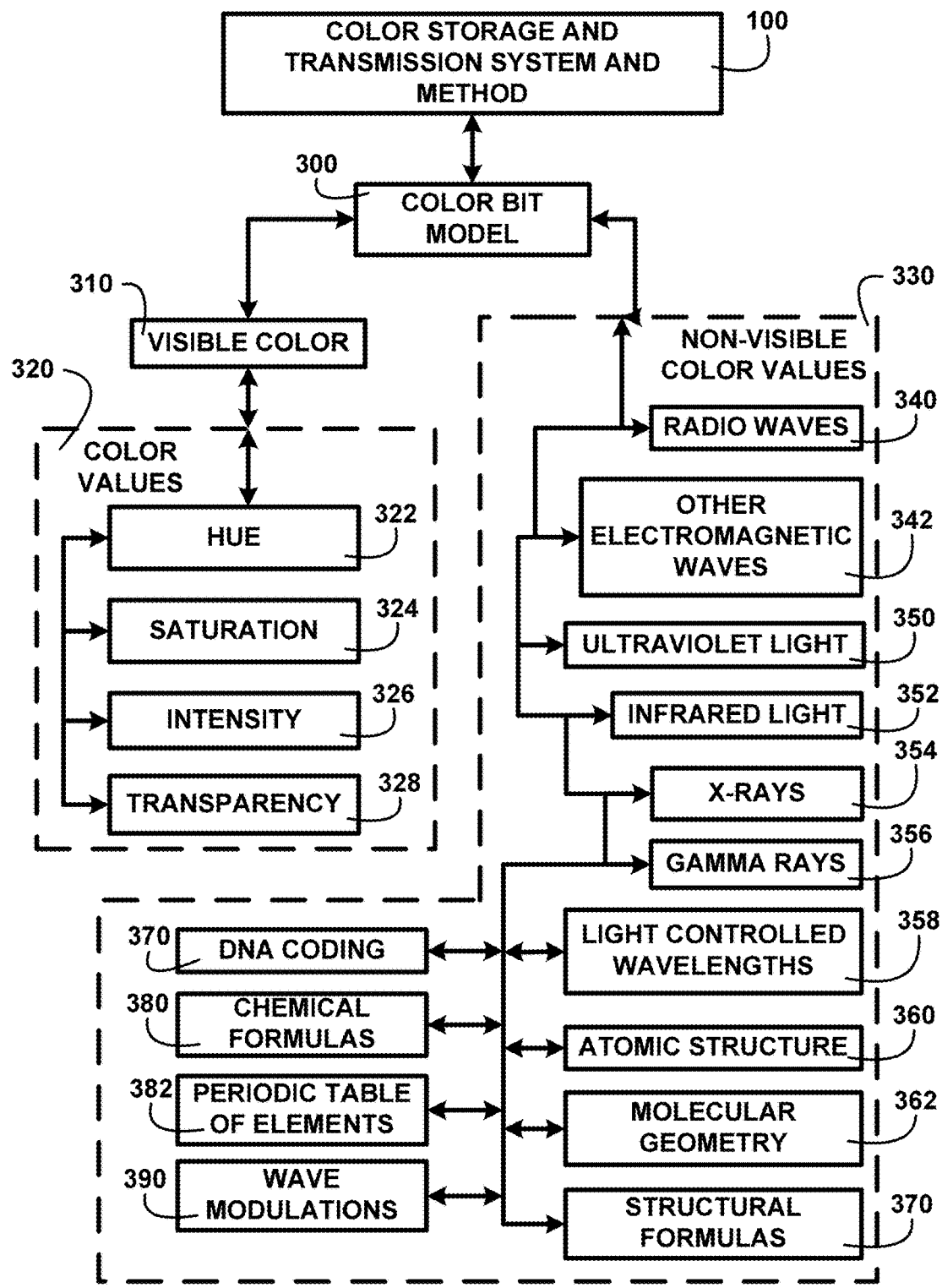
FIG. 3 shows a block diagram of an overview of color mit model systems of an embodiment of the present invention.

FIG. 3 shows a block diagram of an overview of color mit model systems of an embodiment of the present invention. FIG. 3 shows that the color storage system and method 100 has adaptability to use a variety of color/light values as a color mit model 300. The values and coding of the color mit model 300 may be integrated into the color mits 150 of FIG. 1.

The visible color 310, color values 320 and non-visible color values 330 may provide alternate ways to store or transmit information by using the particular values associated with the particular system.

The system may employ visible color 310 as a color mit model 300. Visible color 310 may include color values 320 that increase the distinguishing values of a color. The color values 320 may include, for example, hue 322, saturation 324, intensity 326 and/or transparency 328. In another embodiment, the color values 320 may include red, green and blue values (RGB). There are over 13 million possibilities for the hue, saturation and (luminosity) intensity scale per color mit. In the RGB scale, there are 16.78 million possibilities per color mit. In an example, red can be defined as 255, 0, 0 RGB or 0, 240, 1230 HSL.

The system may also utilize non-visible color values 330 as the color mit model 300 of an embodiment of the present invention. The wavelengths of the visual range are 380 to 740 nm. Wavelengths (and colors) outside the visual range are within the scope of embodiments described herein, such as beyond infrared and ultraviolet. The color mit model 300 may include non-visible color values 330 as the color mit model 300 in an embodiment of the present invention. The color mit model 300 non-visible color values 330 include radio waves 340 and other electromagnetic waves 342. The color mit model 300 may be based on ultraviolet light 360, infrared light 352, x-rays 354, gamma rays 356 and light controlled wavelengths 358. The color mit model 300 non-visible color values 330 may be atomic structure 360, molecular geometry 362 and structural formulas 370.

Alternate ways to store or transmit information may include DNA coding 370, chemical formulas 380, the periodic table of elements 382 and wave modulations 390. The color mit model 300 may use the color value of each element of the Periodic Table of Elements and each chemical compound to assign a different computer-readable instruction to each, such as characters, computer programs, or neurons to transmit information.

The color storage and transmission system and method 100 may use X-rays 354 to record, for example, a medical X-ray in an embodiment. The system has a large area reader 180. The large area reader 180 of FIG. 1 may record the location and intensity of x-rays 354 sensed and records them as non-visible color values 330 as color mits 150 of FIG. 1 on the base material 160. The recorded x-ray non-visible color mit values data may be transmitted to an attending physician immediately for review without waiting for a film to be developed or to another location using the internet for a remote review. The X-ray information may be stored on a read only memory disk and become a convenient part of the patient records in an embodiment of the present invention.

The capability of the color storage and transmission system and method 100 to adapt its configuration to use a variety of color mit model 300 values increases the amount of storage available using color mit 150 data.

Color Mit Database

Figure 4:
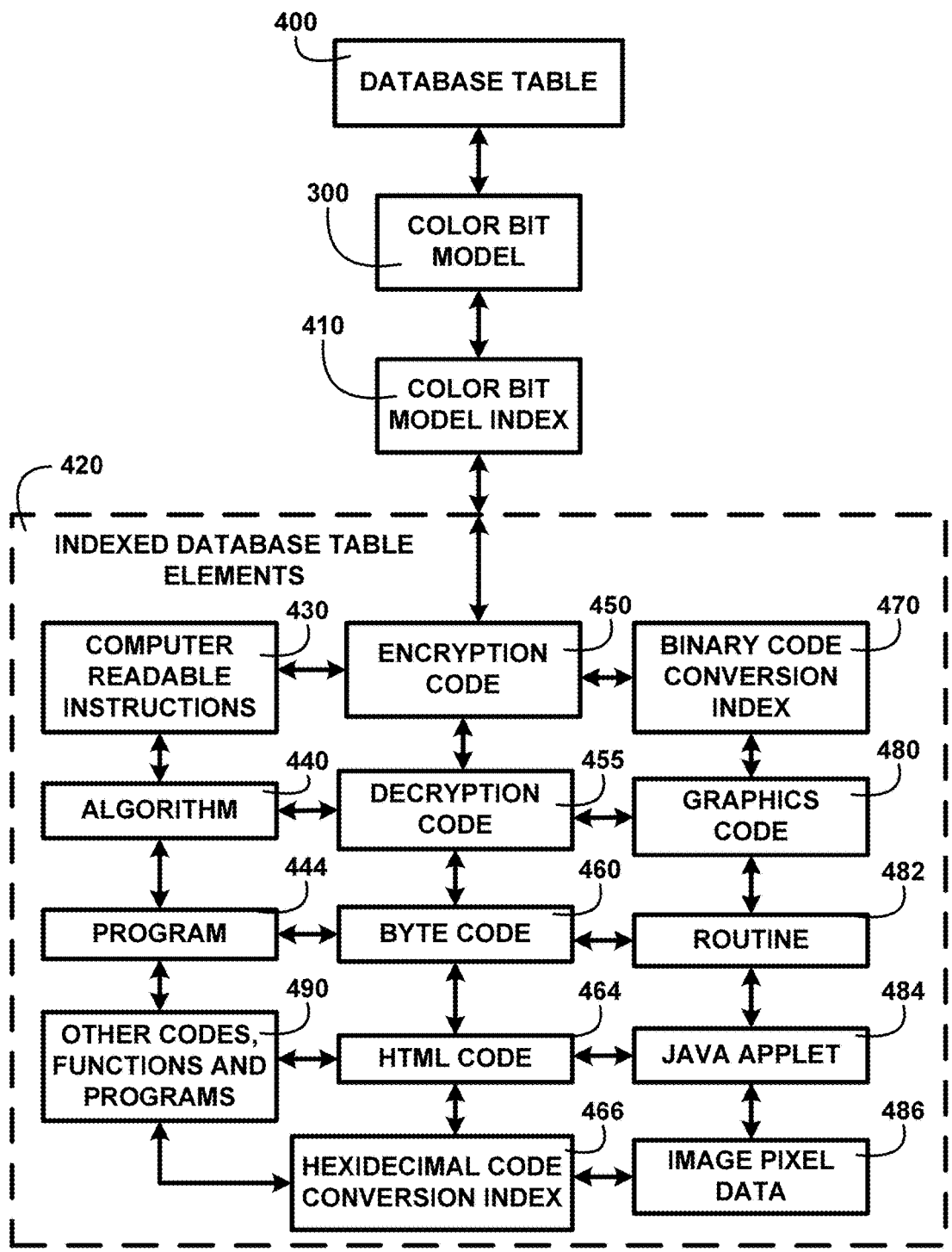
FIG. 4 shows a block diagram of an overview of indexed database table elements of an embodiment of the present invention.

FIG. 4 shows a block diagram of an overview of a color mit database system of an embodiment of the present invention. FIG. 4 shows the database table 400 configured to use a color mit model 300 to create a color mit model index 410 that assigns information for use in generating color mit code to write and record data.

The database uses assigned symbols, functions or complete programs written and read in a read-write storage and retrieval process in an embodiment of the present invention. The database may incorporate tables of prewritten database tables and record new color mit data. The database may include computer readable instructions referenced and indexed by a single color mit symbol in an embodiment of the present invention.

In the instance where new color mit data is recorded, the user may define what a certain color mit represents based on amount and type of usage, for example. In another embodiment, software coupled with the processor acts as artificial intelligence to define what a certain color mit represents based on amount and type of usage, for example. In this embodiment, the artificial intelligence acts to encrypt the color mits.

The database table 400 is used in the conversion (mapping) between the color mit 150 and the instructions. In an embodiment, the binary code may be used in the conversion. The color mit model index 410 provides a database of the elements of the color mit model 300 to assign information to each color mit such as computer-readable instructions. A color mit indexed database and table elements 420 stores the assigned information for use in generating color mit code to write and record data. The color mit 290 of FIG. 2 data read by the reader 180 of FIG. 1 is processed in the database 120 using the color mit model index 410 to retrieve information referenced by the reader 180 of FIG. 1. The information assigned to a color mit model index 410 may include computer readable instructions 430, one or more algorithms 440, one or more computer executable programs 444 and/or other codes, functions and programs 490 in an embodiment of the present invention.

The color mit model index 410 may include encryption method 450 and decryption method 455. In an embodiment the encryption method 450 may include one or more index color mits positioned at the beginning of a color mit sequence. In another embodiment, the encryption method 450 may include multiple color mits positioned throughout a color mit sequence in a predetermined or random manner. The color mit model index 410 may include information to convert color mit 290 of FIG. 2 data into byte code 460, HTML code 464, graphics code 480, hexadecimal code to form a hexadecimal code conversion index 466 and binary code to form a binary code conversion index 470. The code may include a predetermined code key or a user defined code key for encrypted security of data files. The color mit model index 410 may include one or more routines 482, a java applet 484 or true color indicators to store and retrieve image pixel data 486 in an embodiment of the present invention. Encryption and decryption methods are described in more detail herein.

Color Mit Data

As discussed herein color mit data may represent a number of data types. The indexing of color mit data tables in the database 120 assigns color mit data types to fixed indexing positions as part of the processing system 200 of FIG. 2. In one embodiment, the color mit model index 410 uses the hexadecimal code conversion index 466 or binary code conversion index 470 to transmit computer readable instructions 430 to a non-color mit based component in a computer system.

FIGS. 5A, 5B and 5C illustrate, in part, an indexing assignment protocol. At least one of the color mits 150 of FIG. 1 represents computer-readable instructions comprising data 130 other than pixel-image data. The data other than the image-pixel data may include computer-readable data.

FIG. 5A shows a block diagram of an overview flow chart of a pixel-image data bit assignment of an embodiment of the present invention. FIG. 5A shows processing of color mit pixel-image data 520. The indexing of the color mit pixel-image data 520 may include, in a plurality of color mits 500, a first color mit containing pixel-image data 525. The indexing may follow with computer-readable instructions 510. The indexed plurality of color mits 500 may include a second color mit indicating the first color mit is a part of an image 530 as the computer-readable instructions 510. At least some of the plurality of color mits may form an image recognizable to a human eye, wherein the image may include at least one color mit 290 of FIG. 2 that is configured to map to the computer-readable instruction 510 in an embodiment of the present invention.

FIG. 5B shows a block diagram of an overview flow chart of a true color data bit assignment in an embodiment of the present invention. The indexing of color mit true color data 540 may include, in the plurality of color mits 500, the first color mit 290 as a header that indicates the next color mit is going to be interpreted as its true color. The indexing may include a first color mit that is a true color header 550 as the computer-readable instructions 510 in a mapping sequence. The mapped first color mit true color header 550 is followed in the second position by a second color mit including true color data 545 in an embodiment of the present invention.

FIG. 5C shows a block diagram of an overview flow chart of an information data bit assignment in an embodiment of the present invention. The indexing of color mit information data 560 includes in the plurality of color mits 500 a first color mit containing information data 565. The index then adds the computer-readable instructions 510 as a second color mit indicating the type of information data 580 in an embodiment of the present invention.

Color Mit Rewrite System

Figure 6:
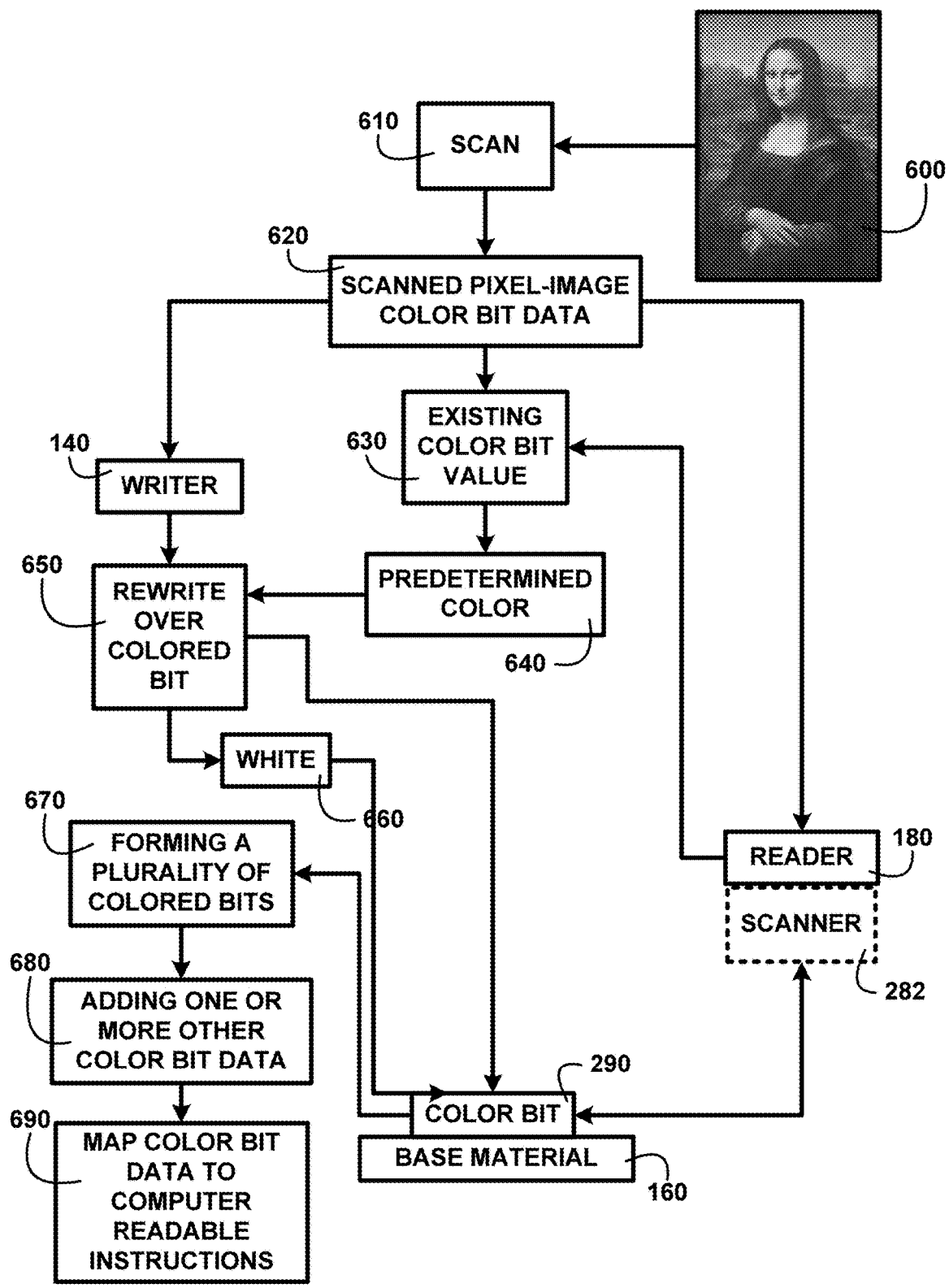
FIG. 6 shows a block diagram of an overview flow chart of a color mit pixel-image data input of an embodiment of the present invention.

FIG. 6 shows a block diagram of an overview flow chart of a color mit pixel-image rewrite system in an embodiment of the present invention. FIG. 6 shows a scan 610 of image 600 and processing the scanned pixel-image color mit data 620. The base material 160 may include a first color mit and a second color mit. The first color mit represents pixel-image data and the second color mit represents that the first color mit is a part of an image. In another embodiment, the base material 160 is configured wherein the plurality of color mits 150 may include a first color mit and a second color mit. In this embodiment, the first color mit represents information data and the second color mit represents that the first color mit contains a particular type of information data.

The processing system 200 of FIG. 2 determines the area of the base material 160 where the scanned pixel-image color mit data 620 may be mapped and written. The processing system 200 of FIG. 2 instructs the reader 180 to use the scanner 282 to read each color mit 290 on the area of the base material 160. The reader 180 transmits the data through the process to analyze the existing color mit value 630 of each color mit 290.

The process further may determine how much hue, saturation and/or intensity is to be added to have a new predetermined color 640 written in the same color mit 290. The process may instruct the writer 140 to rewrite over the color mit 650 with the predetermined color 640. The processing system 200 of FIG. 2 continues forming a plurality of color mits 670 on a base material 160 and adding one or more other color mit data 680 of a type other than pixel-image data. The processing system 200 of FIG. 2 may continue to map color mit data to computer readable instructions 690 in an embodiment of the present invention.

As shown, the writer 140 may write a white 660 color mit over an existing color mit 290 and then rewrite the new predetermined color 640 over the white 660 color mit 290. In another embodiment, a laser 252 of FIG. 2 ablates the existing color mit 290 (such as colored glass) to a top surface of the base material 160. The base material 160 may then be written upon in a new predetermined color. The processing system 200 of FIG. 2 may keep track of how many times a particular location on the base material 160 is ablated. The base material may have a limit as to how many times it may be ablated at a certain location.

Color Mit Pixel Assignment Example

Figure 7:
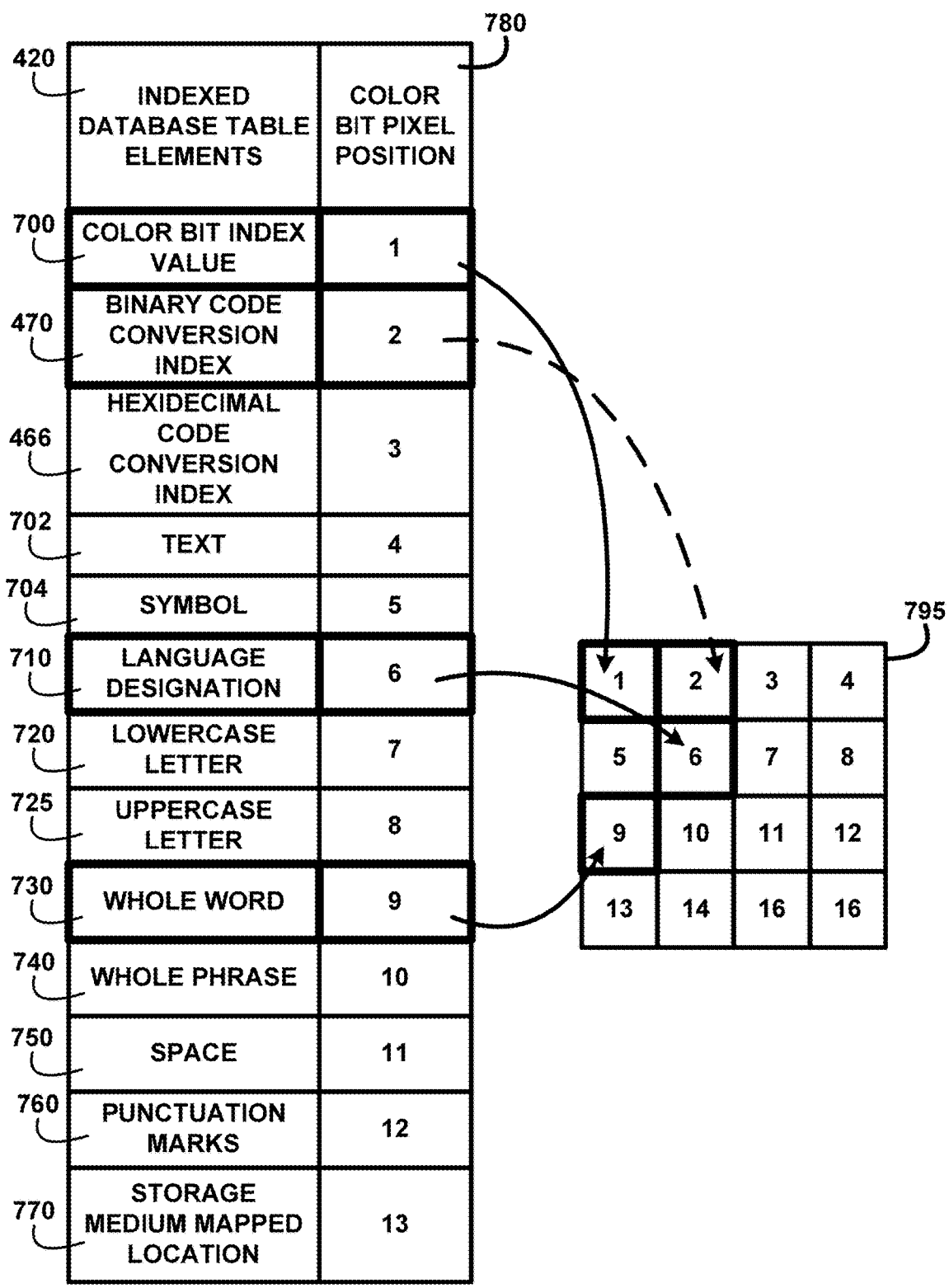
FIG. 7 shows a block diagram of an overview flow chart of a color mit pixel position assignment of an embodiment of the present invention.

FIG. 7 shows a block diagram of a color mit pixel assignment example in an embodiment of the present invention. FIG. 7 shows a block diagram of an example of an embodiment of the present invention wherein the color mit indexed database and table elements 420 may include various codes and information assigned to an indexed mapping position within a color mit configured, for example, as a pixel 795 that is divided into sections. FIG. 7 shows an example of a color mit pixel assignment wherein the color mit indexed database and table elements 420 are configured for assignment to, for example, a specific color mit pixel position 780. In this example, the color mit pixel positions are numbered 1 to 13.

In this example, the color mit indexed database and table elements 420 may include a color mit RGB index value 700, the binary code conversion index 470, the hexadecimal code conversion index 466, a text 702 indicating the information text formatted, a symbol 704 indicating the type of text, a language designation 710 indicating which language is used for the text, a single lowercase letter 720 from the designated language alphabet, a single uppercase letter 725 from the designated language alphabet, a whole word 730, a whole phrase 740, a space 750, punctuation marks 760, and a storage substrate mapped location 770, in an embodiment of the present invention.

A pixel 795 may include several, for example 16, sections. The example shows color mit RGB index value 700 assigned to color mit pixel position 780-1 being imprinted in pixel section 1. Likewise the binary code conversion index 470, the language designation 710 and the whole word 730 are being imprinted in their respective corresponding color mit pixel positions 2, 6 and 9. In this example when the reader 180 of FIG. 1 senses the illuminated color mit, the plurality of colored sections of the pixel 795 may only register the sections in which color is detected and the color mit 290 of FIG. 2 data may retrieve from the database 120 the information for the imprinted color mit indexed database and table elements 420. The color mit may include other patterns and types of sections and basic units other than a pixel of an embodiment of the present invention.

Color Mit Sections

Figure 8A:
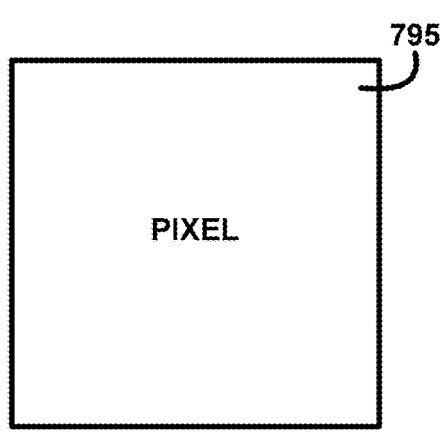
FIG. 8A shows a block diagram of an example of color mit pixel without sections of an embodiment of the present invention.
Figure 8B:
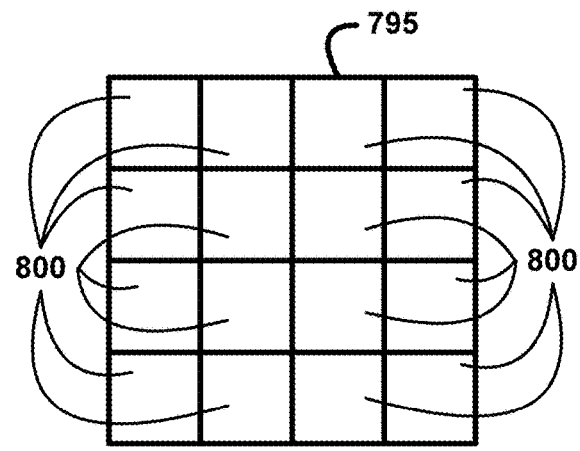
FIG. 8B shows a block diagram of an example of color mit pixel with 16 sections of an embodiment of the present invention.
Figure 8C:
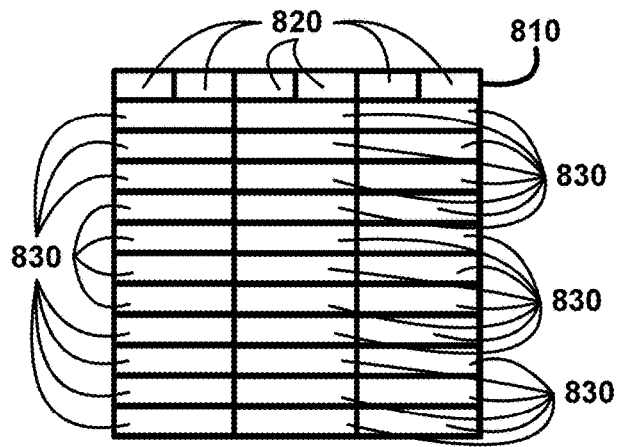
FIG. 8C shows a block diagram of an example of color mit pixel with multiple patterned sections of an embodiment of the present invention.

FIGS. 8A, 8B and 8C shows examples of color mit sections that may be configured for a color mit pixel 795 base unit. FIG. 8A shows a block diagram of an example of a color mit pixel without sections in an embodiment of the present invention. FIG. 8A shows the pixel 795 without any sectionalizing. It may be imprinted with one color mit.

FIG. 8B shows a block diagram of an example of color mit pixel with 16 sections in an embodiment of the present invention. FIG. 8B shows the pixel 795 sectionalized into 16 square sections 800. It may be imprinted with 16 color mits.

FIG. 8C shows a block diagram of an example of color mit pixel with multiple patterned sections of an embodiment of the present invention. FIG. 8A shows the pixel 810 divided into multiple patterns. One pattern may include a pixel color mit bar section 820 configured as shown with 6 color bars and may include one or more bars of colors. The multiple patterned pixels 810 have rows and columns of strip sections 870. The strip sections 870 include one or more sections of various lengths and dimensions. The sectionalizing of pixels or another type or pattern of color mit base unit provide additional space for more or different color mit data 250 to be stored to expand the color mit data 250 informational record in an embodiment of the present invention.

Color Mit Data Storage Base Material

The base material may be fused silica, glass, chemically strengthened glass (such as Gorilla® Glass by Corning®), any set of thin film layers, a semiconductor such as silicon or ceramic, silicon wafer, metal, fabric, such as a piece of paper, plastic or a combination of materials. The base material may include materials having characteristics including not being able to rewritten upon after the writable surface is erased. User applications may include making a permanent, non-rewriteable record of data for archiving purposes. In other embodiments, the base material may be rewritable.

In an embodiment, the color mit may be glass fused with a predetermined color pigment, ink, toner, or colored glass, for instance.

Hybrid Color Storage

The computer system may include both color mit and binary electronic or magnetic bit components, thereby forming a hybrid computer system. The hybrid computer systems use binary or magnetic disk drives for data storage with the color storage system and method 100 of FIG. 1 to increase storage capacity and decrease processing time. Disk 900 may include a magnetic disk and a plurality of color mits 150 of FIG. 1.

The color storage system and method 100 may be a combination of over 16 million bit color-based components and bi-stable on/off technology components to form a hybrid color-based computer system. The computer system may be configured completely with color-based components or a mix of color-based and magnetic bit based components. The 2 bit on/off technology components may include bit-patterned media, where the color mits are formed on each of the magnetic bits in the bit patterned media. The color mits may be formed on color absorbent material and delimited by color-repelling material, in an embodiment.

The hybrid computer systems may use hard disk drives with the color storage and transmission system and method 100 of FIG. 1 to increase storage capacity and decrease processing time and be able to communicate with non-color mit components using the conversion indices. This may additionally provide a transitional implementation of the color mit system components with magnetic based memory components in an embodiment of the present invention.

Figure 9A:
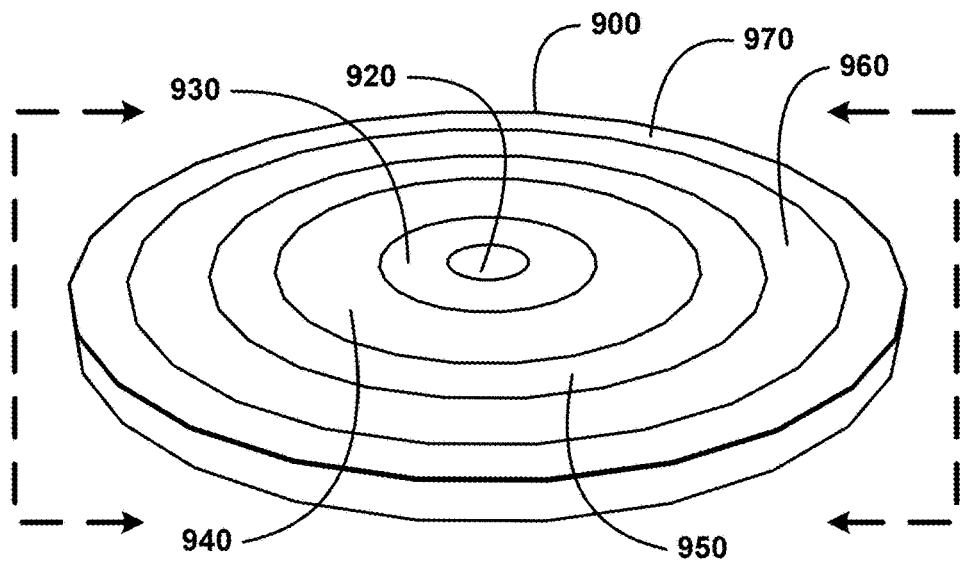
FIG. 9A shows an example of a hybrid color mit disk perspective view of an embodiment of the present invention.

In another embodiment, disk 900 may include data ridges 910 of an optical disk and a plurality of color mits 150 of FIG. 1. FIG. 9A shows an example of a hybrid storage (e.g., color mit & blu-ray) disk perspective view of an embodiment of the present invention. FIG. 9A shows a hybrid storage disk 900, which may include a disk spindle hole 920 and various ring sections of differing read/write machine readable media. The inner ring 930 may include magnetic bits 910. The additional rings have increasingly larger surface areas and may include optical ridges 940 for a DVD medium for image data and an additional ring 950 configured with color mits to store other types of data. The database 120 of FIG. 1 stores on outer rings 960 and 970, color mits 290 in an embodiment of the present invention.

In another embodiment, within each of the rings are both the magnetic bits and color mits. In another embodiment, within each of the rings are both the ridges of a DVD disk and the color mits. There may be separate layers, where the color mit layer is closer to the index, base material and the DVD ridges layer is on top of the color mit layer, or vice versa. In another embodiment, there may be two or more color mit layers accessed by the reader (or writer) through different laser angles.

The hybrid storage disk 900 uses different components or computer systems where both color mit and non-colored bit systems comprise the overall system. The hybrid storage disk 900 may include use in a multiple media (e.g., magnetic, optical or color) composite component configured to communicate with a large number of non-color mit systems. The dual or tri-operating capacity of the hybrid storage disk 900 may reduce systems machine-readable instruction conversion indices in an embodiment of the present invention.

Figure 9B:
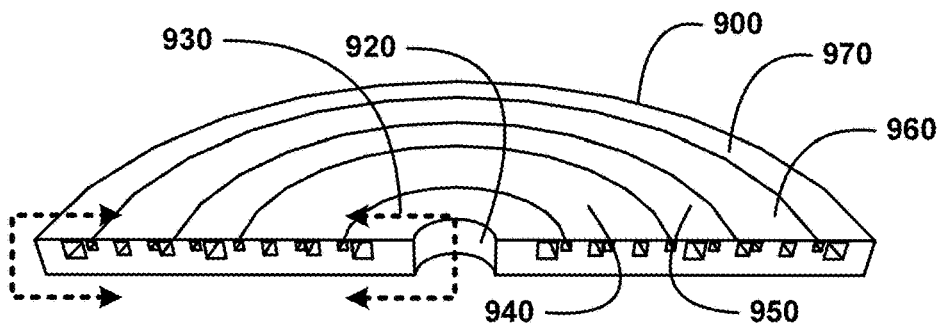
FIG. 9B shows an example of a hybrid color mit disk section view of an embodiment of the present invention.

FIG. 9B shows the hybrid storage disk 900 in a section view in which the composition of the interior is visible. The disk spindle hole 920 and the various ring sections of differing read/write machine readable medium may be clearly seen. The inner ring 930, and additional rings including the DVD medium 940, additional ring 950, outer ring 960 and outermost ring 970 may be supported by a substrate. A section view of the ridges is shown on FIG. 9C that follows.

Figure 9C:
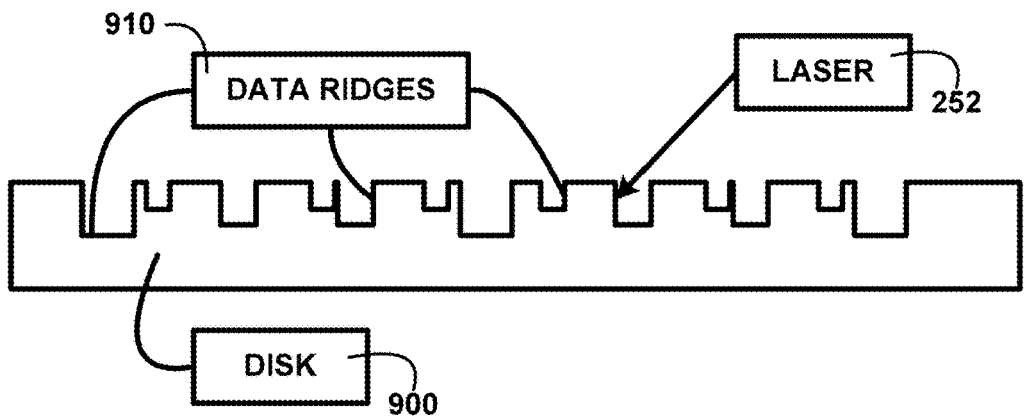
FIG. 9C shows an example of a hybrid color mit disk data ridges section view of an embodiment of the present invention.

FIG. 9C shows an example of a hybrid color mit, DVD or blu-ray disk data ridges, and magnetic bit section view in an embodiment of the present invention. The surface profile includes data ridges 910 on the base material 160 or substrate that may be read by a laser 252. The laser 252 may produce a red, blue, UV, or any other color laser 252 light in an embodiment of the present invention.

In another embodiment, laser 252 comprises a beam having a possibility of one of a plurality of colors that utilize frequency (or wavelength) hopping. Each color has a different wavelength and thus reads each ridge and valley of optical storage differently. The laser 252 uses an index color, such as red, to read an index ridge or valley, such as the innermost ridge, from the disk 900 in this embodiment. That index ridge indicates what the second laser color is to be, for instance, or some other data, such as a number or a letter. The second laser color, which may also be another index laser color, reads the disk at the same or another indicated ridge or valley, which could indicate yet another color laser to use or yet some other data. The optical disk 900 may have many layers, each with ridges and valleys.

Figure 10A:
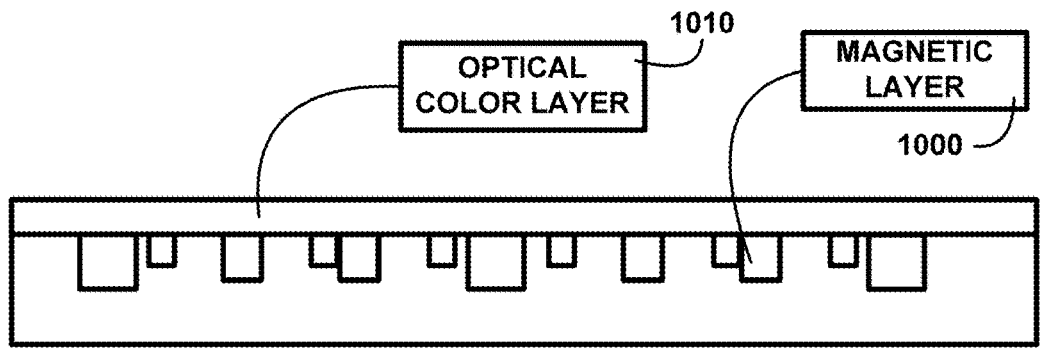
FIG. 10A shows an example of an example of a two layer color indexing using a magnetic layer and an optical color layer of an embodiment of the present invention.

FIG. 10A shows an example of a multi-layered color storage media that includes a magnetic layer 1000 and a color layer 1010. Either the magnetic layer or the color layer 1010 may be the index layer, having at least one bit that indicates information regarding another bit in the same layer or another layer.

There are at least two layers of optical, magnetic, and/or color storage. One of the layers, for example, the index layer, indicates which laser color to use on the other color or optical layer or layers. The index layer may be magnetic, optical or color.

In an alternative embodiment, the index layer indicates where on a 3-D cube of colored pixels to direct a colored laser. The color of the laser is indicated by the index layer. The color of the laser is verified by the verification or calibration process described herein.

The magnetic layer may, for example, include a bit-patterned magnetic layer. The magnetic layer 1000 may be used to write and read a laser color index used to customize the use of two or more color lasers to read color mit data on the optical color layer 1010. In yet another embodiment, there is at least one layer of color storage (i.e., color mits), each of the color mits being read by a colored laser having a color selected as indicated by a previously read indexed color mit. In this embodiment, another alternative is to use the laser color selected by an indexed color mit that is read next (or in the future). In this alternative an indexed color mit read next and/or previously (or in the past) indicates how to interpret the other color mits.

Figure 10B:
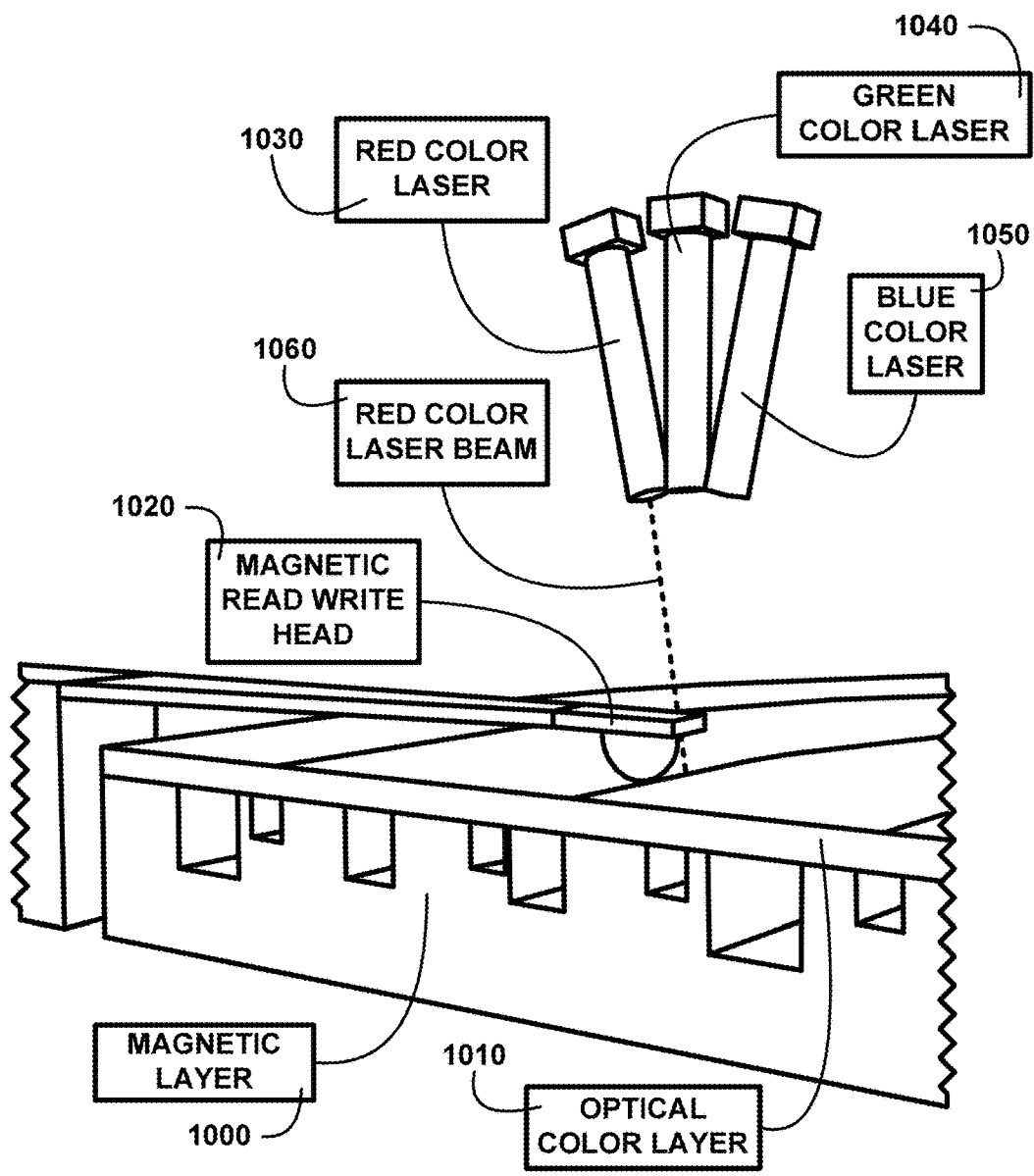
FIG. 10B shows an example of an example of a two layer color indexing process of an embodiment of the present invention.

FIG. 10B shows an example of an example of a two layer color indexing process of an embodiment of the present invention. FIG. 10B shows the exampled two layer structure that includes the magnetic layer 1000 and optical color layer 1010. A magnetic read write head 1020 may be used to write an index of two or more lasers with differing colors and then read in the future the color laser to be used to read the color mits on the optical color layer 1010. The example in FIG. 10B shows a red color laser 1030, a green color laser 1040 and a blue color laser 1050 that are oriented to strike and read a color mit position. The magnetic read write head 1020 may read an index that indicates a red color laser beam 1060 is to be used to read the designated color mit on the optical color layer 1010. In an example, the laser might read: red, blue, yellow and orange color mits. The orange one is an indexed color mit that indicates how to unscramble the red, blue and yellow associated data.

In this embodiment, if the previously read index color mit indicates to use a red color laser 1030 on the next color mit in the process, and the next color mit is yellow, the red color laser beam 1060 strikes the yellow and returns orange to the scanner, the orange meaning a certain number, for instance. If the red color laser beam 1060 strikes white, and returns pink to the scanner, the pink indicates a different number, for instance. However, if the previously read index color mit indicates to use a blue color laser 1050 on the next color mit in the process, and the next color mit is yellow, the blue color laser beam strikes the yellow and returns green to the scanner, the green indicating yet a different number.

In an embodiment, several users may use the same substrate and interpret it 16 million different ways for each color mit on the substrate. The same substrate may be given to different users, each user has their own program and database tables that writes to and/or interprets the color mits on the substrate, based on the different possible laser colors. In this embodiment, each user may create its own codebook, personal and customized, a unique key to understanding the storage data.

The base material 160 or substrate materials may include an applied coating or treatment with, for example, machine-readable medium. The machine-readable medium may include materials that allow for imprinting color with the color transfer device 242 of FIG. 2, such as the printer 244 of FIG. 2, or a photo sensitive material for transmitting color and light wavelength frequencies using the light the light source 272 of FIG. 2, for example, the laser 252 of FIG. 2. The machine-readable medium includes materials, for example, optical and magnetic media for creating hybrid storage medium, disk or dimensioned storage medium in an embodiment of the present invention.

The data storage capacity provided by use of the color storage and transmission system and method 100 of FIG. 1 may be increased as more useable surface areal density may be realized, for example, buffer areas for superparamagnetic interference may be used for color storage. The increase in data storage capacity increases processing speed as more data can be read in the same processing cycle in an embodiment of the present invention.

Laser Etched Color Mit System

In an embodiment, the color mits may be laser engraved onto the base material. In another embodiment, the writer 140 of FIG. 1 may include a laser to laser color etch each color mit 150 of FIG. 1. The laser etch may be that of TherMark® laser marking technology. As described at http://www.thermark.com/content/view/16/86/, glass frits and metal oxide pigments (including differing colors in differing amounts) are heated together using a laser source to form a colored glass bit on top of the base material.

The laser marking technology may employ a CYMK color mit model 300 of FIG. 3 that provides four-color color mits, thereby further increasing the number of combinations per a single color mit 290 of FIG. 2.

The writer 140 of FIG. 1 may be configured as a color atomic laser etcher that uses a laser to apply color mits in differing sizes. The writer 140 may write millions of colors permanently to the base material 160 of FIG. 1. The color mit base material 160 of FIG. 1 may become a permanent archive for data. The writer 140 of FIG. 1 may use the same laser at a higher setting to burn off the color mit material thereby removing or erasing the color mit 290 of FIG. 2 to make space for the writer 140 of FIG. 1 to place a new color mit 290 of FIG. 2 at the same location.

Holographic Color Mit System

The writer 140 of FIG. 1 may write two- or three-dimensional holographic color mits onto the base material 160 of FIG. 1. The first light source 272 of FIG. 2 projects a light color mit pattern and the second projects a reference light beam. The reference light beam scatters the first projected light in what appears to be a random pattern onto the base material 160 of FIG. 1. Both of the frequencies of the light wavelengths are recorded in the database 120 of FIG. 1 to allow the reader 180 of FIG. 1 to project both light beams in order to reconstruct the first color mit pattern during a read process.

The holographic color mit process may be incorporated into the encryption method 450 of FIG. 4 and decryption method 455 of FIG. 4 sections of the database table 400 of FIG. 4 record as a means of encryption security.

Infrared Color Mit System

The writer 140 of FIG. 1 may project non-visible infrared color mits onto the base material 160 of FIG. 1. The base material 160 of FIG. 1 may be an infrared film or compartmentalized sections filled with a heat-absorbing gas such as carbon dioxide. The gas-filled compartments are covered with a thin layer of film material, such as glass or plastic, thereby trapping the gas inside. The writer 140 of FIG. 1 projects the infrared light 352 of FIG. 3 and the thermal signature of the infrared color mit 290 of FIG. 2 is absorbed by the gas and recorded in the database 120 of FIG. 1. The compartments provide isolation to maintain the thermal signature.

In an embodiment the infrared color mit system may be configured to include a reduced insulating rating to allow the trapped gas to cool over a shorter period of time. The infrared system with shortened thermal holding time may be used for temporary cache memory functions.

The infrared film may record a permanent record of the infrared light frequency and may record in the database 120 of FIG. 1. An infrared sensor may be used to read the infrared color mit 290. This permanent recording base material 160 of FIG. 1 may be used for archiving data information.

Plasma Color Mit System

The base material 160 of FIG. 1 may be configured with color mit pixel cells, each with three sub-pixel section cells. Each sub-pixel section may be coated with a different nanophosphor compound that emits different colors, such as red, green and yellow, when excited by ultraviolet light 350 of FIG. 3. The pixel and sub-pixel cells may be filled with one or more gases, such as xenon and/or neon, to remove oxygen, protect the phosphor coating, and interact with the laser light to be projected into cells. The pixel cells may be sealed with a cover plate, such as glass. The writer 140 of FIG. 1 may include three lasers that focus their projected ultraviolet light 350 of FIG. 3 on each of the three sub-pixel sections. The writer/reader driver may control the ultraviolet light 350 of FIG. 3 and intensity 326 of FIG. 3 of each ultraviolet laser.

The ultraviolet light 350 of FIG. 3 may excite the phosphor and cause the phosphor to emit its respective color to an intensity 326 of FIG. 3 corresponding to the amount of intensity 326 of FIG. 3 projected by the laser. The combined light emissions of the three sub-pixels may be adjusted by variance of the individual ultraviolet light 350 of FIG. 3 intensities to create any visible color and a range on non-visible colors. The combined excited phosphor light emission may be detected by the writer/reader using a visible sensor, such as a color scanner 282 of FIG. 2 and non-visible sensors, such as an infrared detector to determine the color mit 290 of FIG. 2 value. The writer/reader driver may record in the database 120 of FIG. 1 the mapped location of the color mit, the three light intensities projected, and the color mit 290 of FIG. 2 value.

The excited phosphor color mit emissions may be temporary and fade when the lasers are moved or turned off. In an embodiment, the plasma color mit system may be used for temporary cache memory functions. In another embodiment, the base material 160 of FIG. 1 may be reread by the reader 180 of FIG. 1 using the database 120 of FIG. 1 color mit 290 of FIG. 2 information by projecting the three light intensities through its three lasers into the mapped location of the color mit 290 of FIG. 2. The color mit 290 of FIG. 2 light emission value may be detected by the reader 180 of FIG. 1 and checked against the recorded color mit 290 of FIG. 2 value and upon verification continue transmission to the component requesting the information.

Color Mit Calibration

The base material 160 of FIG. 1 may contain a fixed section in which permanent color mits are recorded to create a calibration color chart. Each color and its color mit value of the calibration color chart may be recorded in a color calibration table in the database 120 of FIG. 1. The system may be programmed to perform a calibration sequence in which the writer 140 of FIG. 1, reader 180 of FIG. 1 or combined writer/reader may receive computer-readable instructions 510 of FIG. 5 to write and read each color of the calibration color chart into a test section of the base material 160 of FIG. 1. The color mit values of the test sections are checked against the color mit values in the color calibration table to determine accuracy. If the test color mit values are determined to be higher or lower than the calibrated values, then the drivers for the writer 140 of FIG. 1 and reader 180 of FIG. 1 are adjusted to correct the variance.

The calibration sequence may include a check, in which the storage areas of the base material 160 of FIG. 1 having color mits are read and checked against the recorded color mit 290 of FIG. 2 value in the database 120 of FIG. 1. If a bad color mit 290 of FIG. 2 is detected in which the color mit 290 of FIG. 2 value varies from the recorded value, the writer 140 of FIG. 1 is instructed to either overwrite the color mit with appropriate color to adjust to the recorded color mit 290 of FIG. 2 value or erase and rewrite the color mit to the correct color mit value.

A verification of the color of the laser from the index bit, pixel, or layer occurs where the following method checks the color of the laser light: (a) its frequency is measured (e.g., wavelength in nanometers), and (b) the RGB values are converted to HSL values or vice versa, and the color of the laser is independently measured, for example, using a spectrometer or photometer.

Color Mit External Drive System

Figure 11:
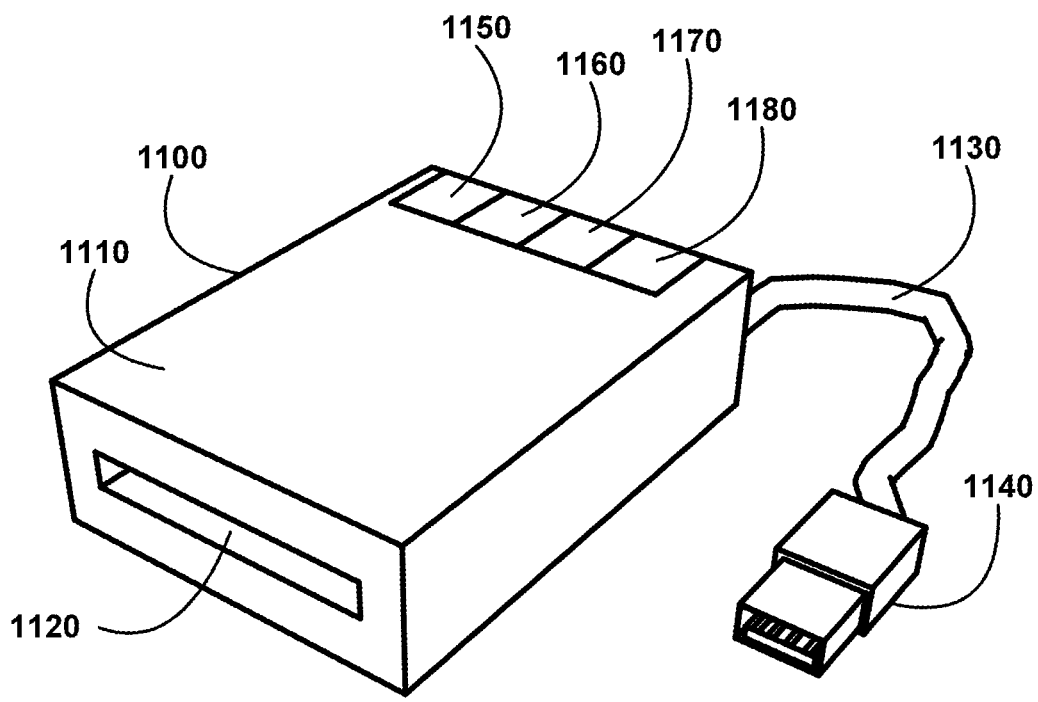
FIG. 11 shows an example of a color mit external USB drive perspective view of an embodiment of the present invention.

FIG. 11 shows an example of a color mit external USB drive perspective view of an embodiment of the present invention. FIG. 11 shows a color mit external USB drive 1100 using the color storage and transmission system and method 100 of FIG. 1. The color mit external USB drive 1100 may include the processing system 200 of FIG. 2 and the storage system 210 of FIG. 2 to read and/or write data. The color mit external USB drive 1100 may include a drive case 1110 to house the elements and a slot 1120 to accept the insertion of a color mit based substrate using the color mit data storage base material, such as a disk.

The color mit external USB drive 1100 may include a sensor/scanner/reader, and a writer 140. The writer may include a variety of printed color mit systems, for example, a color ink jet printer, a laser color jet printer, a color laser etcher or other means for placing color mits 150 of FIG. 1 on the base material 160 of FIG. 1. The writer feature may include a black ink cartridge 1150, magenta ink cartridge 1160, a cyan ink cartridge 1170, and a yellow ink cartridge 1180, for example, to imprint RGB coded colors and color values 350 of FIG. 3 on the substrate. The writer feature may also include a nano-laser writer to form colors on the substrate, as described herein.

The color mit external USB drive 1100 using a RGB color mit model 310 of FIG. 3 may include the printer 244 of FIG. 2, a USB cable 1130, and a USB connector 1140 to allow the drive 1100 to be connected to non-color mit components, including non-color mit computer systems. The color mit external USB drive 1100 example shows how the color storage and transmission system and method 100 of FIG. 1 can be adapted to create hybrid data storage and processing components for a hybrid system application in an embodiment of the present invention.

Base Material Dimensions

Figure 12:
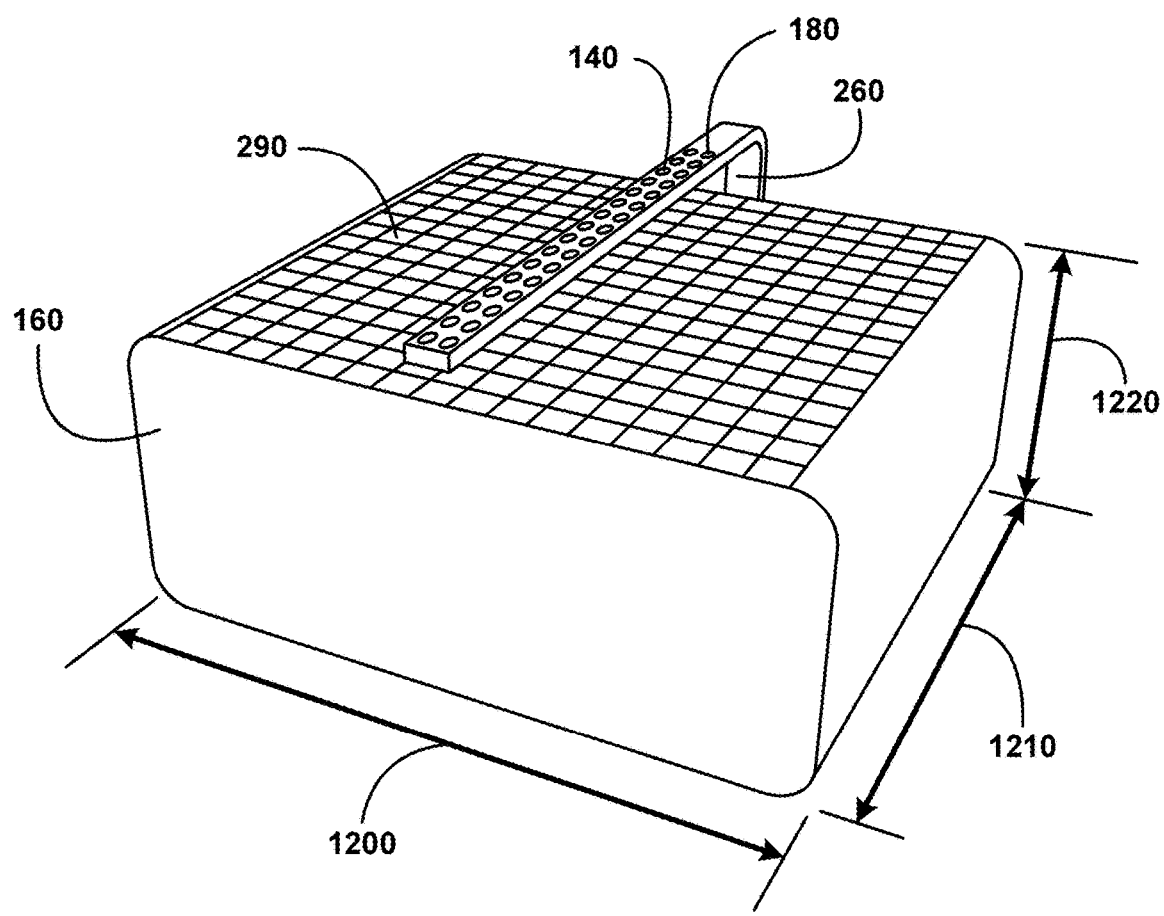
FIG. 12 shows an example of a color mit write and read system in perspective view of an embodiment of the present invention.

FIG. 12 shows an example of a color mit write and read system in perspective view of an embodiment of the present invention. FIG. 12 shows an example of the base material 160 with the arm 260 installation positioned above the color mits 150. The base material 160 may have any dimensions of length l 1200, width w 1210, or thickness t 1220. In an embodiment the length l 1200 is greater than the width w 1210 which is greater than the thickness t 1220. In an embodiment, the base material 160 may be the size of a credit card, a DVD disk, a Hard Disk Drive, any size of a simple piece of paper or canvas, or any surface or substrate suitable for comprising a plurality of color mits 150. The arm 260 may be extended over the base material 160 surface and include one or more writers 140 of FIG. 1 or readers 180 of FIG. 1 or a combined color mit writer-reader.

Curved Track Writer-Reader Combination

Figure 13:
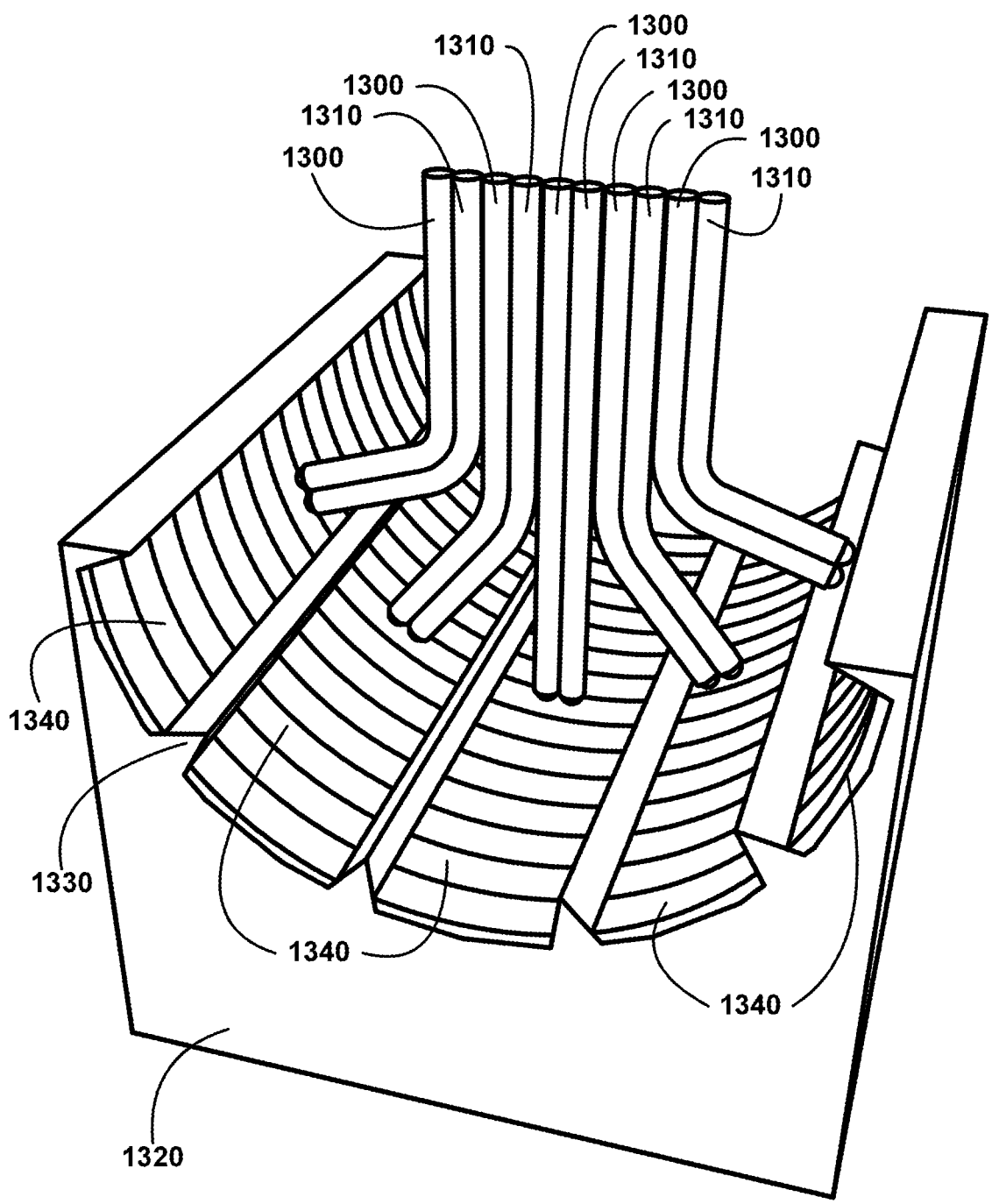
FIG. 13 shows an example of an example of a curved track color mit disk surface perspective view of an embodiment of the present invention.

FIG. 13 shows an example of a curved track color mit disk surface perspective view. FIG. 13 shows an embodiment of the present invention wherein the color mit data storage base material 160 of FIG. 1 may be configured as a series of curved concaved tracks 1320. The curved concaved track 1320 increases the amount of surface area available since the distance of the curved surface is greater than the perpendicular surface area of the corresponding opening. The curved concaved tracks 1320 is used for imprinting color mits 290 of FIG. 2 with ink or transmitting color light wavelength frequencies to a photo sensitive material applied to the substrate. FIG. 13 shows the substrate formed with, for example, peaked track dividers 1330. The surface area between the peaked track dividers 1330 is used for application of a material 1340 configured to accept imprint of color mits with ink using the printer 244 of FIG. 2. The printer 244 of FIG. 2 has a remote spray tube and orifice 1300 to imprint the color mit. The writer 140 of FIG. 1 uses the laser 252 of FIG. 2 to erase or remove the ink/pigment used to imprint the color mit 290 of FIG. 2.

The laser 252 of FIG. 2 may include a fiber optic strand 235 of FIG. 2 to project the laser light onto the color mit section of the curved concaved tracks 1320 of an embodiment of the present invention. In another embodiment of the curved concaved tracks 1320, the reader 180 of FIG. 1 may include a fiber optic strand 235 of FIG. 2 configured as a light transport fiber 1300. The light transport fiber 1300 connects to the light source 272 of FIG. 2 to transmit the light projected by the laser 252 of FIG. 2 to illuminate the color mit imprinted on the material 1340. The reader 180 of FIG. 1 may include a fiber optic strand 235 of FIG. 2 configured as a reflected light-receiving fiber 1310. The reflected light-receiving fiber 1310 is connected to the color sensor 280 of FIG. 2, for example the color scanner 282 of FIG. 2, in an embodiment of the present invention.

In another embodiment, the material 1340 applied to the curved concaved tracks 1320 is a photosensitive material. The color mit sections of the curved concaved tracks 1320 are written using the light transport fiber 1300 to transmit a color light wavelength frequency to be absorbed by the photosensitive material 1340. The stored color light wavelength frequency may be erased or neutralized using the light transport fiber 1310 to transmit a light wavelength to, in opposition to the stored frequency, dampen the frequency.

In another embodiment of the curved concaved tracks 1320, the reader 180 of FIG. 1 excites the photosensitive material 1340 to broadcast the stored color light wavelength frequency. The reader 180 of FIG. 1 may include a fiber optic strand 220 of FIG. 2 configured as a reflected color light wavelength frequency receiving fiber 1310. The reflected light receiving fiber 1310 is connected to the color sensor 280 of FIG. 2, for example color scanner 282 of FIG. 2, or a tuner receiver configured to register the range of frequencies of the color mit model 300 being used in the color storage system and transmission system and method 100 of FIG. 1. FIG. 13 shows the adaptability of the color storage and transmission system and method 100 of FIG. 1 to maximize available data storage surface area with shaped configurations that are not possible where the proximity of the data would increase the superparamagnetic interference of magnetic bit storage in an embodiment of the present invention.

Color Based Computer Architecture

Figure 14:
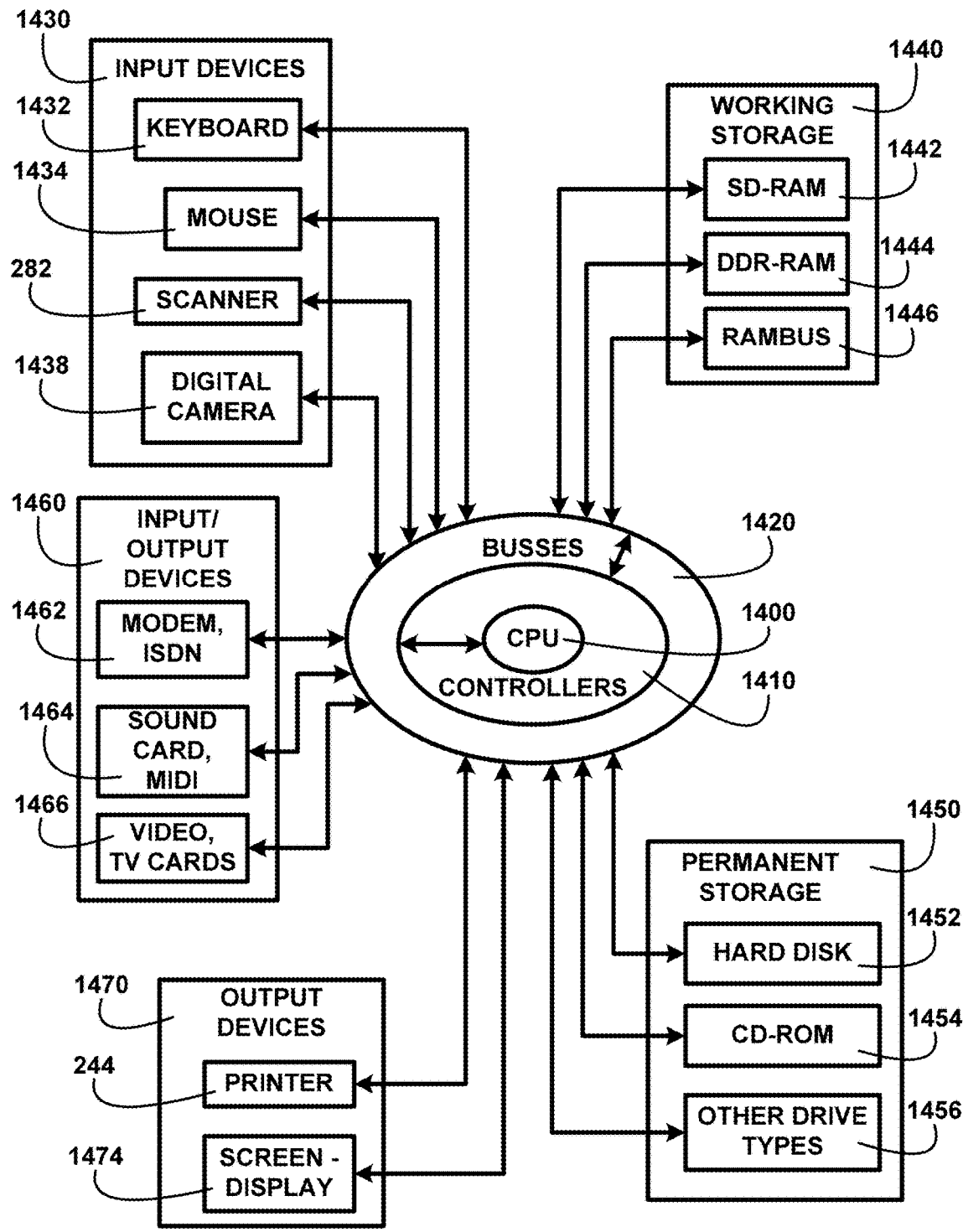
FIG. 14 shows a block diagram of an overview flow chart of a color based computer architecture system of an embodiment of the present invention.

FIG. 14 shows a block diagram of an overview flow chart of a color based computer architecture system in an embodiment of the present invention. Current computer architecture is based on single bit, on/off technology in which computer words are created by grouping these single bits together. The current architecture, based on the Von Neumann model as shown in FIG. 14, may still be the architecture for the color-based system, but the individual component architectures may be altered dramatically. The color storage system alterations of the individual component architectures based on color, rather than the single on/off bit, may yield a computer approach within the Von Neumann model that has over 16 million states per bit rather than two states per bit.

Hybrid Light and Color-Based Computer System

In a color based system, component groups may include the input devices 1430, such as a keyboard 1432, a mouse 1434, a scanner 282 and a digital camera 1438, working storage 1440 including SD-RAM 1442, DDR-RAM 1444, and RAMBUS 1446, permanent storage 1450 devices for example hard disk 1452, CD-ROM 1454 and other drive types 1456, input/output devices 1460 including a modem, ISDN 1462, a sound card and/or MIDI 1464 and video, TV cards 1466, and output devices 1470, such as a printer 244 and screen-display 1474.

Appropriate translators may transfer information between the conventional on/off and color processing at the interfaces. In a hybrid embodiment, for 24 bit colors, there are 3 bytes or 3 ASCII characters for each color. In another embodiment, each color represents a word, a graphic, a character, a pixel or a computer program.

In embodiments described herein, the value of a bit (or the value of a byte) is expressed in color. Colors may be formed of 24 bits, 30 bits, 36 bits or more, in an embodiment. For 24 bit colors: 8 bits for red, 8 bits for green and 8 bits for blue. There are over 16 million colors with different hue, saturation, and intensity (aka value or lightness).

Color Based Computer System Network Deployment

Figure 15:
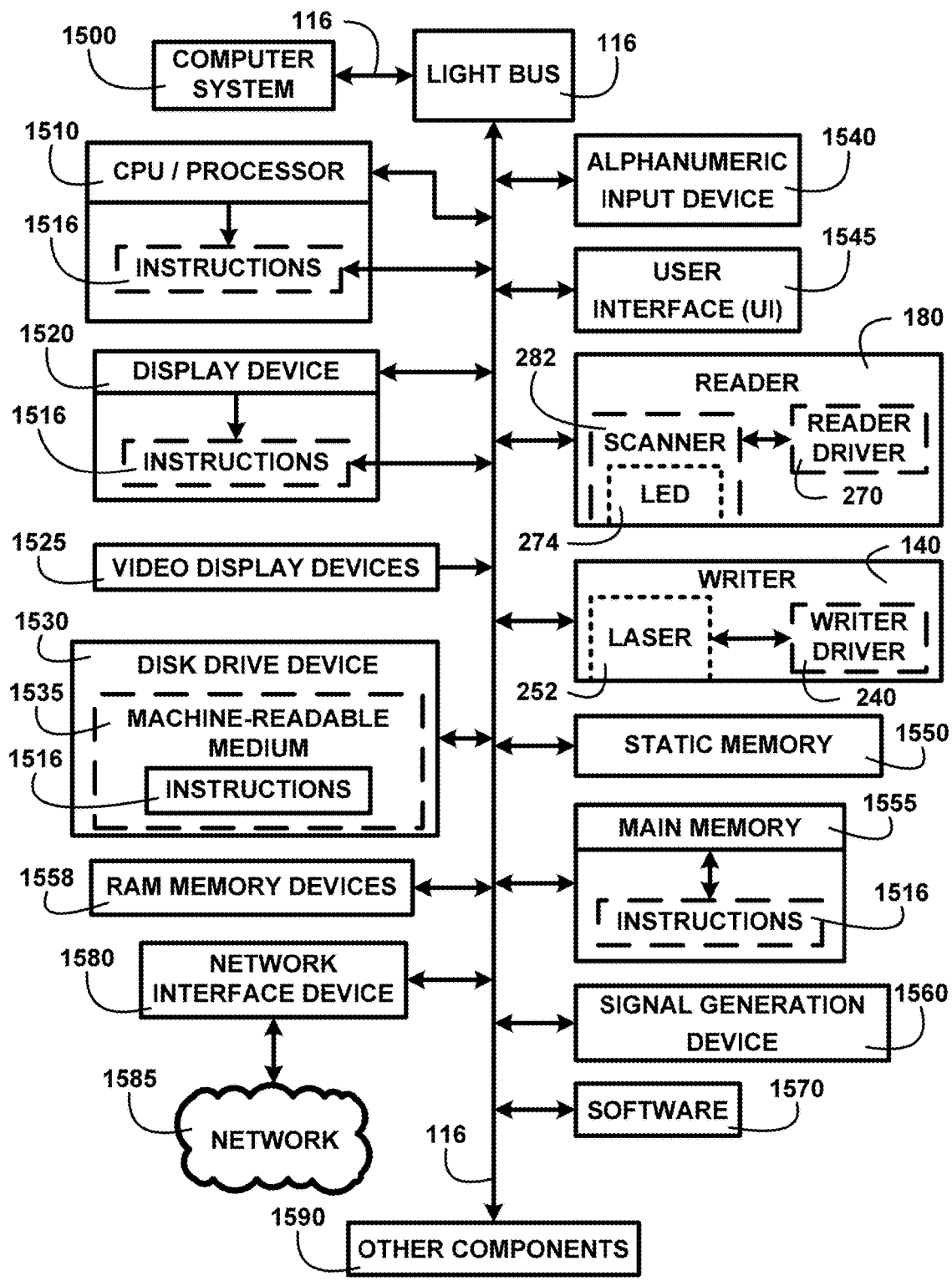
FIG. 15 shows a block diagram of an overview flow chart of a color based computer system network deployment of an embodiment of the present invention.

FIG. 15 shows a block diagram of an overview flow chart of a color-based computer system network deployment in an embodiment of the present invention. FIG. 15 shows a computer system 1500 connected to components through the light bus system 230 to increase transmission and, therefore, increase processing time. The light bus system may provide light speed connectivity to the components including a CPU/processor 1510 that transmits instructions 1515 to direct the operations and function of the components connected to the light bus 116 in an embodiment of the present invention.

An alphanumeric input device 1540, such as a keyboard and user interface (UI), may include a mouse to enable the user to create direct input into the computer system 1500. A search request by the user from the keyboard may instruct the reader 180 to read data using the reader driver 270 to initiate the scanner LED 274 to illuminate the color mits and send the search results to a display device 1520 that may send instructions 1515 to, for example, a printer to print the search results. The reader driver 270 may also transmit through the bus system to one or more video display devices such as a liquid crystal display (LCD), light emitting diode (LED) 274, or a cathode ray tube (CRT) to allow the user to see the results of an embodiment of the present invention.

The search results may be transmitted to the CPU/processor 1510 for calculation processes. The CPU/processor 1510 may send instructions 1515 to the writer 140 to add the calculated results to the database 120 of FIG. 1 by sending the instructions 1515 to the writer driver 240 to initiate the laser 252 to, for example, perform a color etching of the results on the base material 160 of FIG. 1. The database 140 may be included in a drive device 1530. The drive device 1530 may store one or more sets of instructions and data structures, such as software 1570.

The software 1570 may also reside, completely or at least partially, within the main memory 1555 and/or within the processor 1510 during execution thereof by the computer system 1500, the main memory 1555 and the processor 1500 also constituting machine-readable medium 1535. The memory units such as static memory 1550 and RAM memory devices 1558, as well as the drive device 1530 and machine-readable medium 1535, may each be comprised of color storage as described herein. The software 1570 may include programming to transmit data through the light bus 116 to a signal generation device 1560, such as a speaker to play music. The software 1570 may further be transmitted or received over a network 1585 utilizing any one of a number of well-known transfer protocols, such as HTTP.

The computer system 1500 may include a network interface device 1580, for example, a modem or network router to allow the color mit component to transmit and receive data to and from a network 1585. Other components 1590 based on the color mit architecture may be connected to the computer system 1500 through a connection to the light bus 116. The connection may include a USB plug or PCI slot. The connection of the color mit computer system 1500 to a network 1585 allows a color mit based system of components to operate with non-colored bit systems or components also connected to the network in an embodiment of the present invention.

In alternative embodiments, the computer system 1500 operates as a standalone device or may be connected (e.g., networked) to other computer systems 1500. In a networked deployment, the computer system 1500 may operate in the capacity of a server or a client computer system 1500 in server-client network environment, or as a peer computer system 1500 in a peer-to-peer (or distributed) network environment. The computer system 1500 may be a personal computer (PC), a tablet PC, a set-top box (STB), a Personal Digital Assistant (PDA), a cellular telephone, a web appliance, a network router, switch or bridge, or any computer system 1500 capable of executing a set of instructions (sequential or otherwise) that specify actions to be taken by that computer system 1500. Further, while only a single computer system 1500 is illustrated, the term computer system 1500 shall also be taken to include any collection of machines or components that individually or jointly execute a set (or multiple sets) of instructions to perform any one or more of the methodologies discussed herein.

Machine-Readable Medium

While the machine-readable medium 1535 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, color media, optical media, and magnetic media.

Color Mit Encryption

Data security in the color storage and transmission system and method 100 of FIG. 1 begins with the color mits themselves. Without access to the database used to write and read the color mits, it may be difficult to reconstruct the over 16 million possible meanings of the color mits. But with the data residing on a storage device in the computer system, the potential is there for unauthorized access in an embodiment of the present invention.

Figure 16:
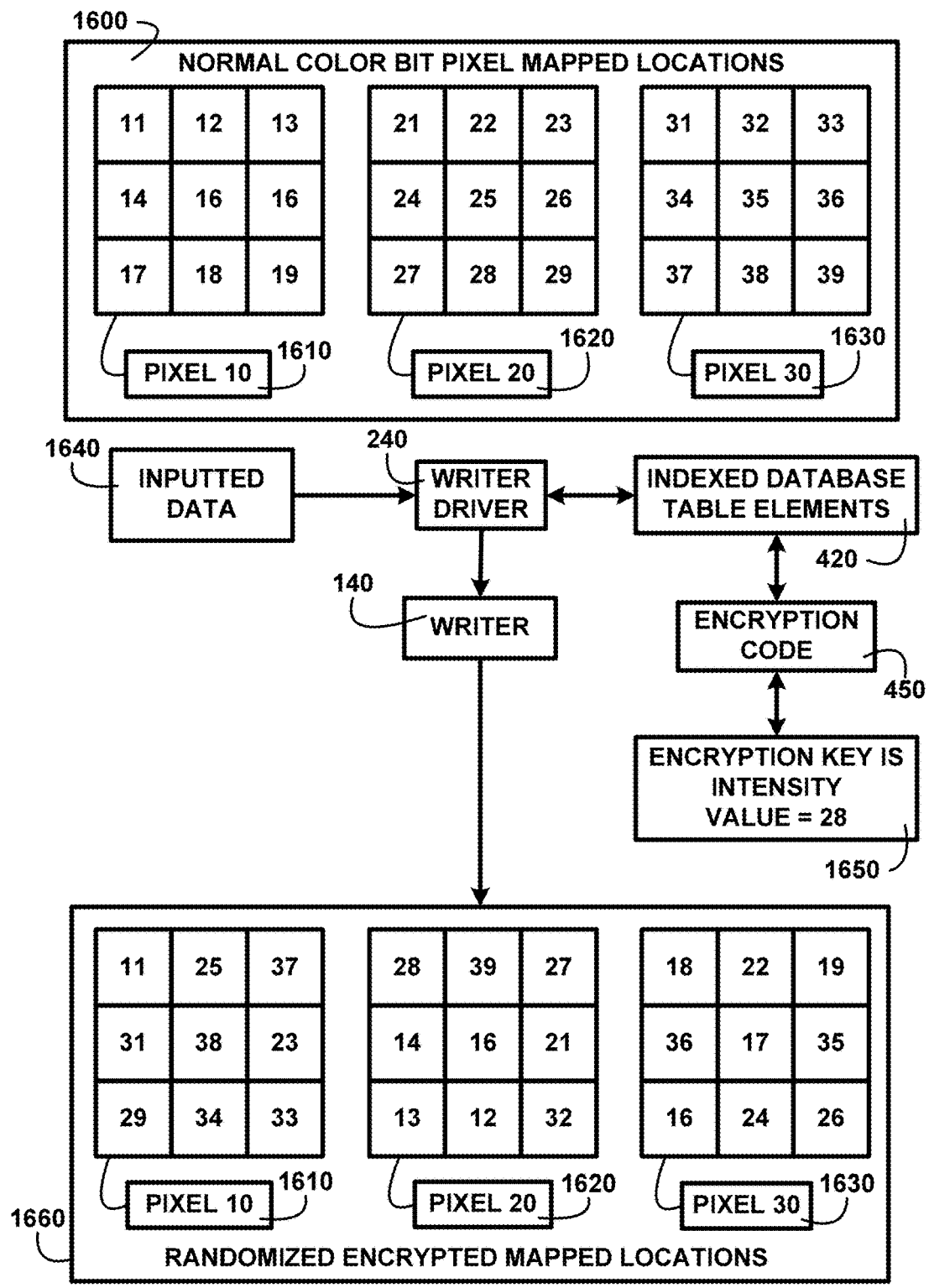
FIG. 16 shows a block diagram of an overview flow chart of a color mit encryption process of an embodiment of the present invention.

FIG. 16 shows a block diagram of an overview flow chart of a color mit encryption process of an embodiment of the present invention. FIG. 16 shows an embodiment of a color mit encryption process. The normal color mit pixel mapped locations 1600 are written upon in sequential order based on the color mit pixel position 780 of FIG. 7 in the indexed database table elements 420. The three 9 section pixels labeled pixel 10 1610, pixel 20 1620 and pixel 30 1630 are numbered sequentially to identify the mapped locations in an embodiment of the present invention.

Inputted data 1640 may be transmitted from any input devices 1330. In an embodiment, at least one color mit of the plurality of color mits is encrypted. The encrypted color mit may be decrypted with a key or passcode or act as an encryption indicator. The inputted data at block 1640 processes through the writer driver 240 which searches the indexed database table elements 420 for placement positions and to check whether an encryption method 450 is included in the data. In this example, the data requests the encryption method 450, where an encryption key, in this example, is intensity value equal to 28 at block 1650. The encryption key color value is used by the writer driver 240 to instruct the writer 140 to randomize the placement of the inputted data at block 1640. The data is written into randomized encrypted mapped locations at block 1660 in the three pixels as shown on FIG. 16 and in the first three columns of Table No. 1 below, in an embodiment of the present invention.

This is only one example embodiment of color mit encryption. Any application using color mit storage and the methods described herein, combined with hashing, symmetric cryptography and/or asymmetric cryptography for encryption is within the scope of the embodiments of this disclosure.

Color Mit Decryption

Figure 17:
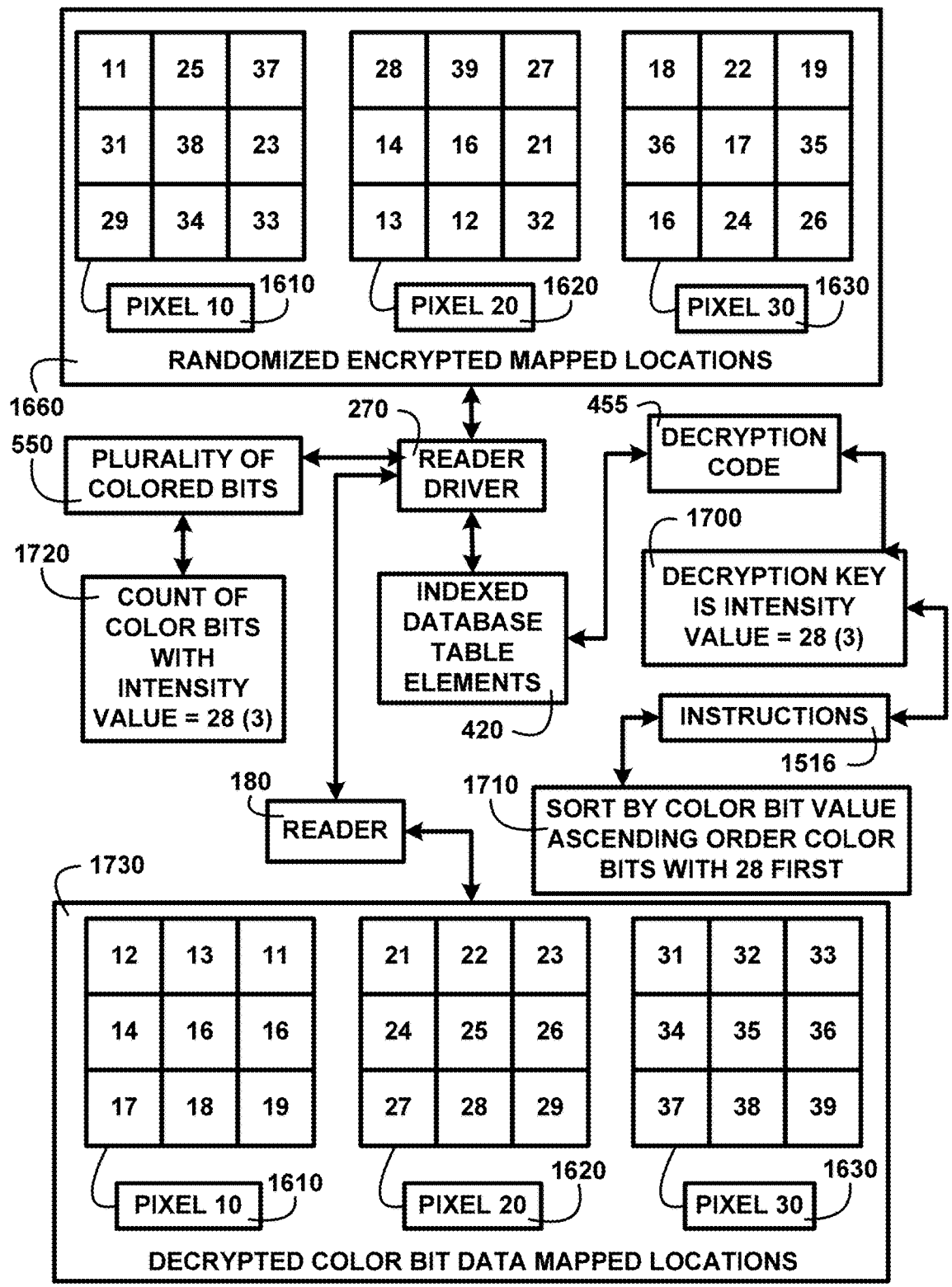
FIG. 17 shows a block diagram of an overview flow chart of a color mit decryption process of an embodiment of the present invention.

FIG. 17 shows a block diagram of an overview flow chart of a color mit decryption process in an embodiment of the present invention. FIG. 17 shows the reader driver 270 instructing the reader 180 to read the randomized encrypted mapped locations at block 1660. The reader driver 270 searches the indexed database table elements 420 to check whether an encryption key value that may have been assigned to the data. The indexed database table elements 420 records show a decryption method 455 has been assigned and a decryption key has an intensity value equal to $28^3$ at block 1700 indicating 3 intensity values of 28 may be found in the data. At block 1710, the instructions 1516 for this decryption key may include to sort by color mit value in ascending order color mit with 28 first.

The instructions are passed through to the reader driver 270 which checks the plurality of color mits 550 and returns a count of color mits with intensity value equal to 28 to be 3, at block 1720. Having verified the decryption method 455 conditions, the reader driver 270 interprets the data read by the instructions and the results are sent to the user. The results of the reader driver 270 are shown in the proper decrypted color mit data mapped locations, at block 1730 and in Table No. 1 below.

TABLE NO. 1

| RANDOMIZED ENCRYPTED MAPPED LOCATIONS | | | DECRYPTED COLOR MIT DATA MAPPED LOCATIONS | | |
| --- | --- | --- | --- | --- | --- |
| COLOR MIT MAPPED LOCATIONS | RGB COLOR MIT VALUE | COLOR VALUE INTENSITY I VALUE | COLOR MIT MAPPED LOCATIONS | RGB COLOR MIT VALUE | COLOR VALUE INTENSITY I VALUE |
| 25 | 166047086 | 14 | 11 | 211177199 | 28 |
| 11 | 211177199 | 28 | 12 | 029254166 | 28 |
| 37 | 146240225 | 62 | 13 | 177152097 | 28 |
| 31 | 124121008 | 63 | 14 | 008028167 | 96 |
| 38 | 136157050 | 74 | 15 | 014174106 | 56 |
| 23 | 236138072 | 02 | 16 | 018018200 | 09 |
| 29 | 230124106 | 59 | 17 | 019215167 | 72 |
| 34 | 202009033 | 88 | 18 | 020251182 | 75 |
| 33 | 220045020 | 36 | 19 | 041024040 | 17 |
| 28 | 142155131 | 50 | 21 | 076242235 | 17 |
| 39 | 202209066 | 58 | 22 | 106168063 | 73 |
| 27 | 018018200 | 09 | 23 | 119090078 | 16 |
| 14 | 244125060 | 83 | 24 | 124121008 | 63 |
| 15 | 029254166 | 28 | 25 | 136157050 | 74 |

TABLE NO. 1-continued

| RANDOMIZED ENCRYPTED MAPPED LOCATIONS | | | DECRYPTED COLOR MIT DATA MAPPED LOCATIONS | | |
|---|---|---|---|---|---|
| COLOR MIT MAPPED LOCATIONS | RGB COLOR MIT VALUE | COLOR VALUE INTENSITY I VALUE | COLOR MIT MAPPED LOCATIONS | RGB COLOR MIT VALUE | COLOR VALUE INTENSITY I VALUE |
| 21 | 255018242 | 78 | 26 | 142155131 | 50 |
| 13 | 119090078 | 16 | 27 | 146240225 | 62 |
| 12 | 076242235 | 17 | 28 | 166047086 | 14 |
| 32 | 019215167 | 72 | 29 | 167040037 | 83 |
| 18 | 008028167 | 96 | 31 | 202009033 | 88 |
| 22 | 167040037 | 83 | 32 | 202209066 | 58 |
| 19 | 041024040 | 17 | 33 | 220045020 | 36 |
| 36 | 020251182 | 75 | 34 | 227059025 | 59 |
| 17 | 232080015 | 63 | 35 | 230124106 | 59 |
| 35 | 227059025 | 59 | 36 | 232080015 | 63 |
| 16 | 177152097 | 28 | 37 | 236138072 | 02 |
| 24 | 014174106 | 56 | 38 | 244125060 | 83 |
| 26 | 106168063 | 73 | 39 | 255018242 | 78 |

The color mit encryption process may provide an automated system to increase user data security and encryption methods and decryption methods.

The Abstract of the Disclosure is provided to comply with 37 C.F.R. Section 1.72(b). It is submitted with the understanding that it may not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by those skilled in the art without departing from the scope of the present invention as defined by the following claims.

What is claimed is:

1. A computer system comprising:
a first component device having a first interface to optically couple with a second interface of a second component device,
wherein the first component device includes a processor to perform processing of data, and calculations,
wherein the processor includes a light transmission circuit within processor architecture configured to optimize processing speeds,
the second component device including one or more of the following:
a network interface device to allow signals to be received via a network, an input/output device including one or more of a router, a sound card, a video card, or a video display device,
a database or a memory including one or more of Random Access Memory (RAM), a disk drive, a static memory, a Read Only Memory (ROM), a main memory, or a Hard disk memory (HDD),
a driver including one or more of a mapping driver, a reader driver, or a writer driver, or
a signal generation device; and
at least one bus optically coupling the first component device with the second component device to optically communicate via an optical data transmission having one or more optical data signals,
wherein the first interface and the second interface each comprise:
a photodetector to receive the optical data transmission through the at least one bus; and
a data converter to convert the optical data signals of the received optical data transmission into particular component device-readable data signals.

2. The computer system of claim 1 wherein the photodetector includes a photodiode.

3. The computer system of claim 1 further comprising the driver configured to map the optical data signals to computer-readable instructions.

4. The computer system of claim 3 wherein the computer-readable instructions include an encryption method, a decryption method, an algorithm, a bytecode, a computer program, a java applet, Hyper Text Markup Language (HTML) code, graphics code, or a routine.

5. The computer system of claim 1 wherein the optical data signals are transmitted along one or more fiber optic strands of the at least one bus between the first component device and the second component device.

6. The computer system of claim 1 wherein the optical data signals comprise a plurality of different light signals, each signal of the plurality of different light signals having a different frequency and corresponding to an unique computer-readable instruction.

7. The computer system of claim 6 wherein the plurality of different light signals includes a first color signal and a second color signal, the first color signal representing information data and the second color signal representing that the first color signal includes a particular type of information data.

8. The computer system of claim 1 wherein the at least one bus includes an optical bus coupled with the light transmission circuit, the optical bus being configured to one or more of receive or transmit data optically to optimize the processing speeds.

9. A system comprising:
a first component device having a first interface to couple with and receive optical data signals from a second interface of a second component device, wherein the first component device includes:
 a processor configured to perform processing of data, and calculations, and
 a light transmission circuit,
the second component device including one or more of the following:
 a network interface device to allow signals to be received via a network, an input/output device including one or more of the following:
  a router,
  a sound card,
  a video card, or
  a video display device,
 a database or a memory including one or more of the following:
  Random Access Memory (RAM),
  a disk drive,
  a static memory,
  a Read Only Memory (ROM),
  a main memory, or
  a Hard Disk Memory (HDD),
 a driver including one or more of the following:
  a mapping driver,
  a reader driver, or
  a writer driver, or
 a signal generation device; and
at least one bus optically coupling the first component device with the second component device to optically communicate via the optical data signals, wherein one or more of the first interface or the second interface comprises one or more of the following: a converter to convert particular component device-readable data signals to the optical data signals for an optical data transmission through the at least one bus; or a light source to send the optical data transmission through the at least one bus.

10. The system of claim 9 wherein the light source includes one or more of a light emitting diode or a laser.

11. The system of claim 9 wherein the optical data signals comprise light from the light source configured to be manipulated, wherein manipulating the light includes one or more of the following:
 bending the light through a prism,
 halving a frequency of the light by passing through crystal,
 combining two or more colors to give a different color, or
 subtracting a color from a light beam by passing it through a filter or multilayer coating.

12. The system of claim 11 wherein manipulating the light is configured to cause processor functions including one or more of the following:
 a move operation,
 an add operation,
 a subtract operation,
 a multiply operation,
 a divide operation, and
 a basic logical operation, or
 an input/output operation.

13. A computer system comprising:
a first component device including a first optical interface, and means for performing processing of data and calculations, wherein the means for performing processing includes means for transmitting light; and
means for optically coupling a first component device with a second component device, wherein the second component device includes one of the following:
 means for receiving a first signal associated with a network,
 means for routing a second signal associated with the network,
 means for transmitting the second signal,
 means for storing data,
 means for mapping data,
 means for reading data,
 means for writing data,
 means for displaying data, and
 means for generating a third signal associated with the network, wherein the first optical interface comprises a means for receiving an optical data transmission through the means for optically coupling and means for converting data associated with the optical data transmission into particular component device-readable data signals, wherein the means for converting data is configured to convert an optical data signal into computer-readable instructions, wherein the computer-readable instructions include an encryption method, a decryption method, an algorithm, a bytecode, a computer program, a java applet, Hyper Text Markup Language (HTML) code, graphics code, or a routine.

14. The computer system of claim 13 wherein the optical data signal is transmitted along a fiber optic strand between the first component device and the second component device.

15. The computer system of claim 13 wherein the optical data signal comprises a plurality of different light signals, each signal of the plurality of different light signals having a different frequency and corresponding to an unique computer-readable instruction.

16. The computer system of claim 13 wherein the means for optically coupling the first component device with the second component device includes an optical bus.

17. A system comprising:
a first component device having a first interface to couple with and receive optical data signals from a second interface of a second component device, wherein the first component device and the second component device include one or more of the following:
 a processor configured to perform processing of data, and calculations,
 a light transmission circuit,
 a network interface device to allow signals to be received via a network,
 an input/output device including one or more of the following:
  a router,
  a sound card,
  a video card, or
  a video display device,
 a database or a memory including one or more of the following:
  Random Access Memory (RAM),
  a disk drive,
  a static memory,
  a Read Only Memory (ROM),
  a main memory, or
  a Hard Disk Memory (HDD), a driver including one or more of the following:
   a mapping driver,
   a reader driver, or
   a writer driver, or
   a signal generation device; and
at least one bus optically coupling the first component device with the second component device to optically communicate via the optical data signals, wherein the first interface is configured to one or more of send or receive a first optical frequency and a second optical frequency, wherein the first optical frequency is associated with a first code and the second optical frequency is associated with a second data code distinct from the first data code,
the system further comprising the driver configured to map the optical data signals to one or more computer-readable instructions, wherein the one or more computer-readable instructions include one or more of an encryption method, a decryption method, an algorithm, a bytecode, a computer program, a java applet, Hyper Text Markup Language (HTML) code, graphics code, or a routine.

18. The system of claim 17 wherein the first optical frequency represents information data and the second optical frequency represents that the first optical frequency includes a particular type of information data.

19. The system of claim 17 wherein one or more of the first interface or the second interface comprises one or more of the following:
   a first converter to convert particular component device-readable data signals to the optical data signals for an optical data transmission through the at least one bus;
   a second converter to convert the optical data signals to the particular component device-readable data signals;
   a photodetector to receive the optical data transmission through the at least one bus; or
   a light source to send the optical data transmission through the at least one bus.

20. The system of claim 17 wherein the light source includes one or more of a light emitting diode or a laser.

* * * * *